(12) United States Patent
Yamamura et al.

(10) Patent No.: US 8,315,757 B2
(45) Date of Patent: Nov. 20, 2012

(54) VEHICULAR DRIVING SUPPORT APPARATUS AND METHOD AND VEHICLE EQUIPPED WITH VEHICULAR DRIVING SUPPORT APPARATUS

(75) Inventors: Tomohiro Yamamura, Yokohama (JP); Takayuki Kondoh, Machida (JP); Kazuto Satou, Atsugi (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 645 days.

(21) Appl. No.: 12/525,923

(22) PCT Filed: Jun. 13, 2008

(86) PCT No.: PCT/JP2008/001529
§ 371 (c)(1),
(2), (4) Date: Aug. 5, 2009

(87) PCT Pub. No.: WO2009/004763
PCT Pub. Date: Jan. 8, 2009

(65) Prior Publication Data
US 2010/0318254 A1 Dec. 16, 2010

(30) Foreign Application Priority Data
Jun. 29, 2007 (JP) .................................. 2007-172298

(51) Int. Cl.
*B60W 40/12* (2006.01)
(52) U.S. Cl. ...................................... 701/29.1; 701/32.9
(58) Field of Classification Search ......................... None
See application file for complete search history.

(56) References Cited

U.S. PATENT DOCUMENTS

| | | | |
|---|---|---|---|
| 5,586,028 A | 12/1996 | Sekine et al. | |
| 5,717,606 A * | 2/1998 | Hara et al. | 701/44 |
| 5,745,031 A * | 4/1998 | Yamamoto | 340/439 |
| 6,061,610 A | 5/2000 | Boer | |
| 6,335,689 B1 | 1/2002 | Mine | |
| 2002/0097160 A1 | 7/2002 | Oyama | |
| 2006/0069498 A1 | 3/2006 | Katayama et al. | |
| 2007/0080816 A1* | 4/2007 | Haque et al. | 340/576 |

FOREIGN PATENT DOCUMENTS

| | | |
|---|---|---|
| EP | 1 551 195 A1 | 7/2005 |
| JP | 2-279440 A | 11/1990 |
| JP | 7-125560 * | 5/1995 |
| JP | 8-249600 A | 9/1996 |
| JP | 11-227491 | 8/1999 |
| JP | 2000-185575 A | 7/2000 |
| JP | 2001-301638 A | 10/2001 |
| JP | 2002-36905 A | 2/2002 |
| JP | 2002-154345 A | 5/2002 |
| JP | 2002-219968 A | 8/2002 |

* cited by examiner

*Primary Examiner* — Michael J. Zanelli
(74) *Attorney, Agent, or Firm* — Foley & Lardner LLP

(57) ABSTRACT

In vehicular driving support apparatus and method and a vehicle equipped with the vehicular driving support apparatus, a running state of a vehicle is detected, a plurality of running state distributions is calculated on a basis of the detected running state data, a difference quantity between the plurality of running state distributions is calculated, and an unstable driving state is detected from a magnitude of the difference quantity. If the unstable driving state is detected, an alarming is issued to call attention to a vehicle driver.

23 Claims, 15 Drawing Sheets

[Fig. 1]
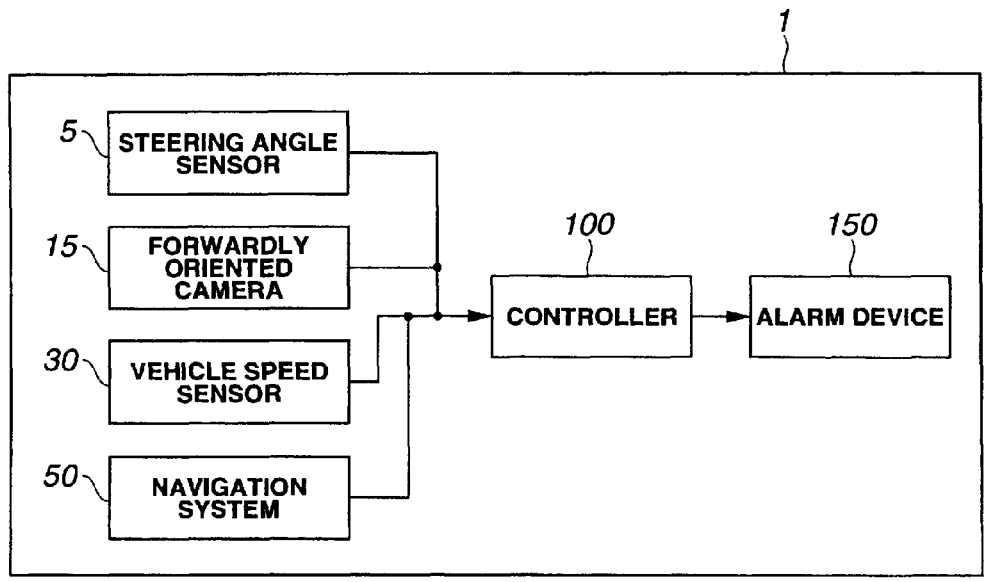
[Fig. 2]
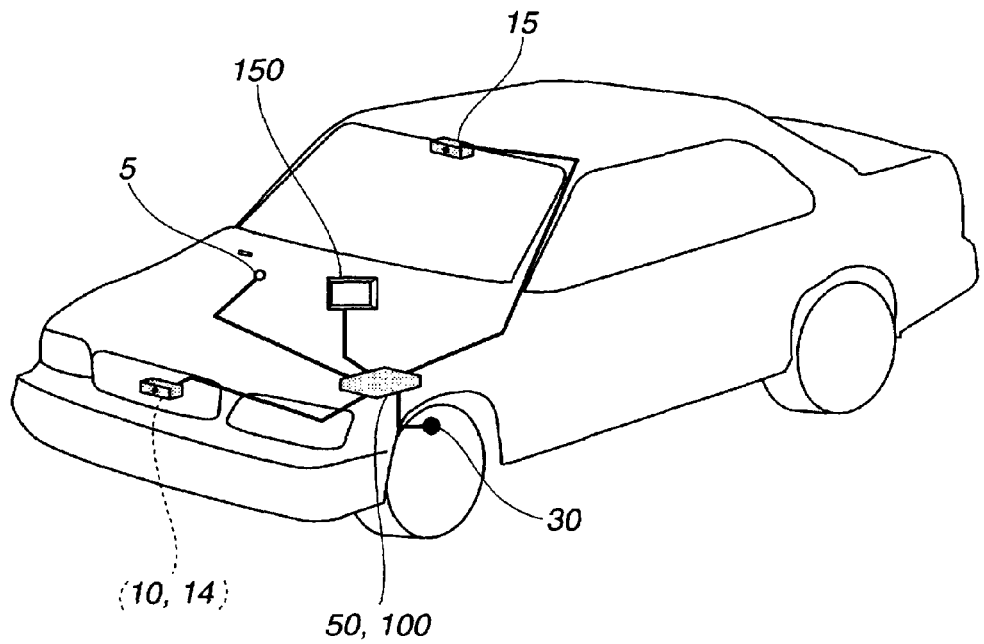

[Fig. 3]
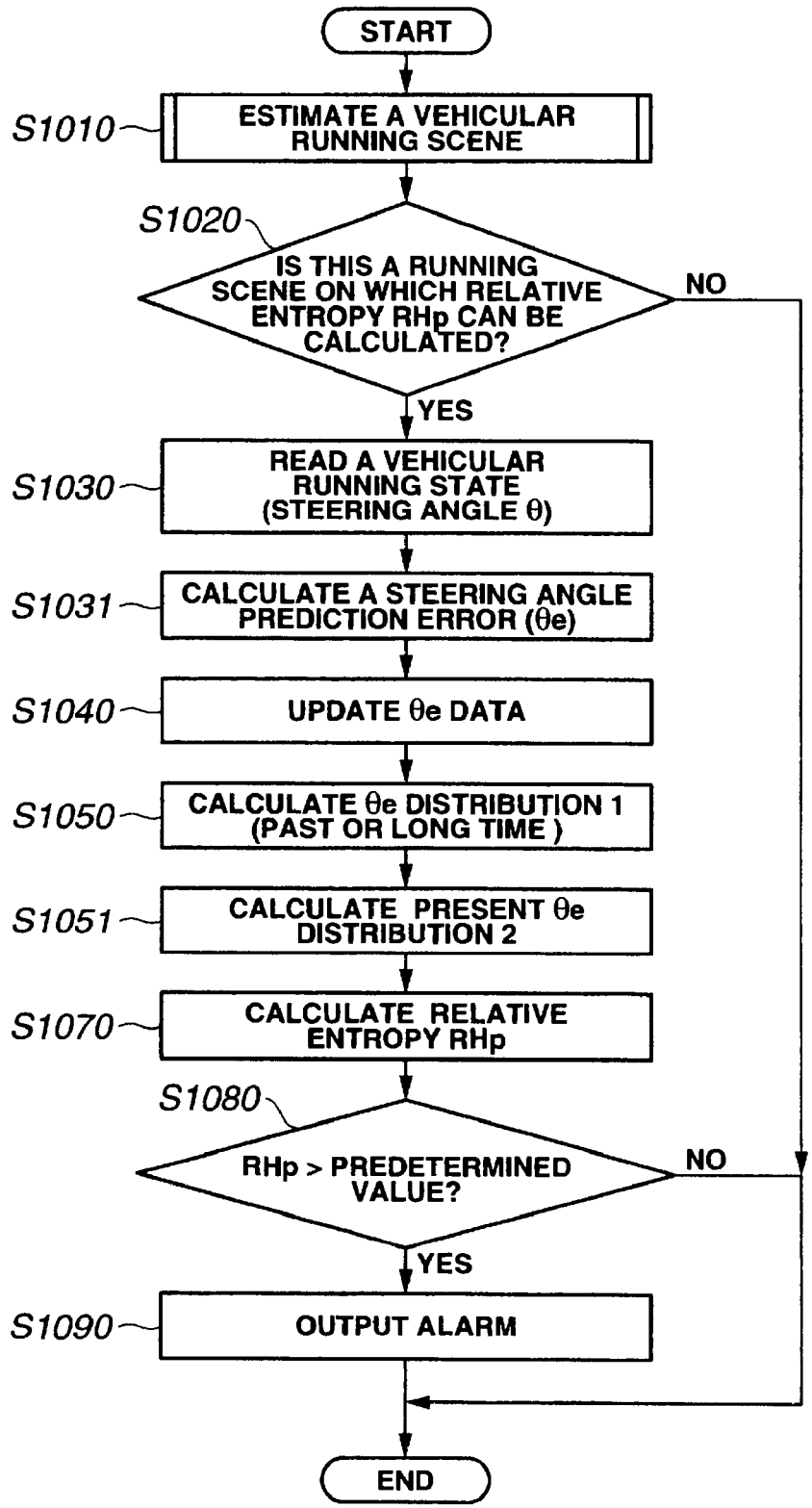

[Fig. 4]
| SYMBOL | NAME |
|---|---|
| $\tilde{\theta}n$ | θn-tilde SMOOTHED VALUE OF STEERING ANGLE |
| $\hat{\theta}n$ | θn-hat ESTIMATED VALUE OF STEERING ANGLE |
[Fig. 5]
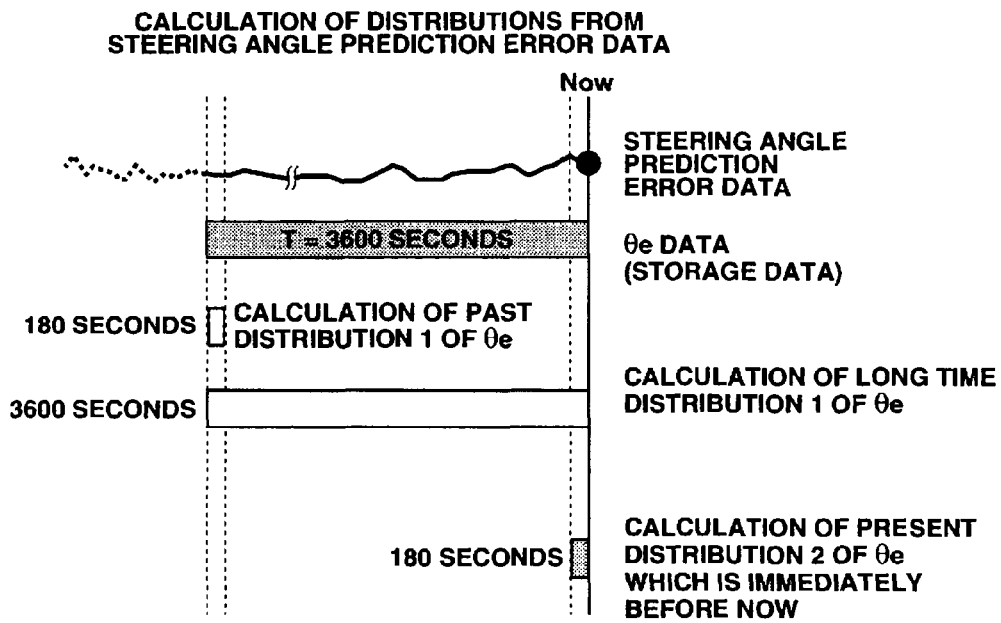
[Fig. 6]
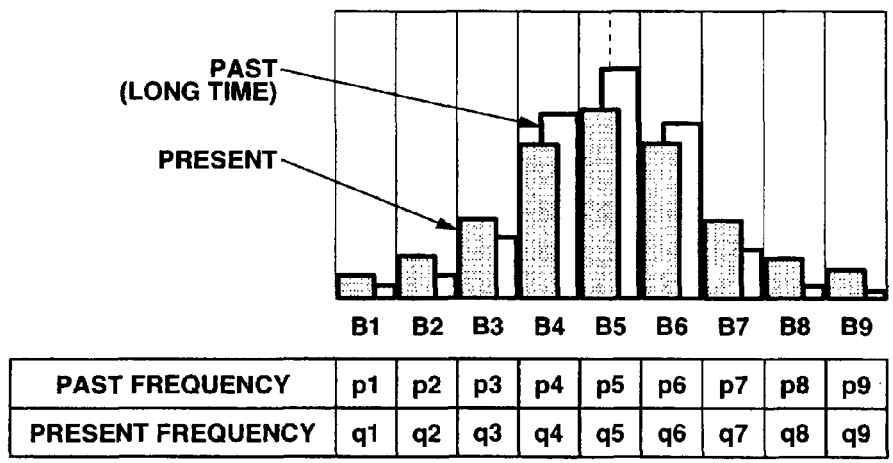

[Fig. 7]

| PARTITION bi | RANGE OF STEERING ANGLE PREDICTION ERROR $\theta e$ | PROBABILITY pi |
|---|---|---|
| b1 | $-\infty \sim -5\alpha$ | p1 |
| b2 | $-5\alpha \sim -2.5\alpha$ | p2 |
| b3 | $-2.5\alpha \sim -\alpha$ | p3 |
| b4 | $-\alpha \sim -0.5\alpha$ | p4 |
| b5 | $-0.5\alpha \sim 0.5\alpha$ | p5 |
| b6 | $0.5\alpha \sim \alpha$ | p6 |
| b7 | $\alpha \sim 2.5\alpha$ | p7 |
| b8 | $2.5\alpha \sim 5\alpha$ | p8 |
| b9 | $5\alpha \sim \infty$ | p9 |

[Fig. 8]
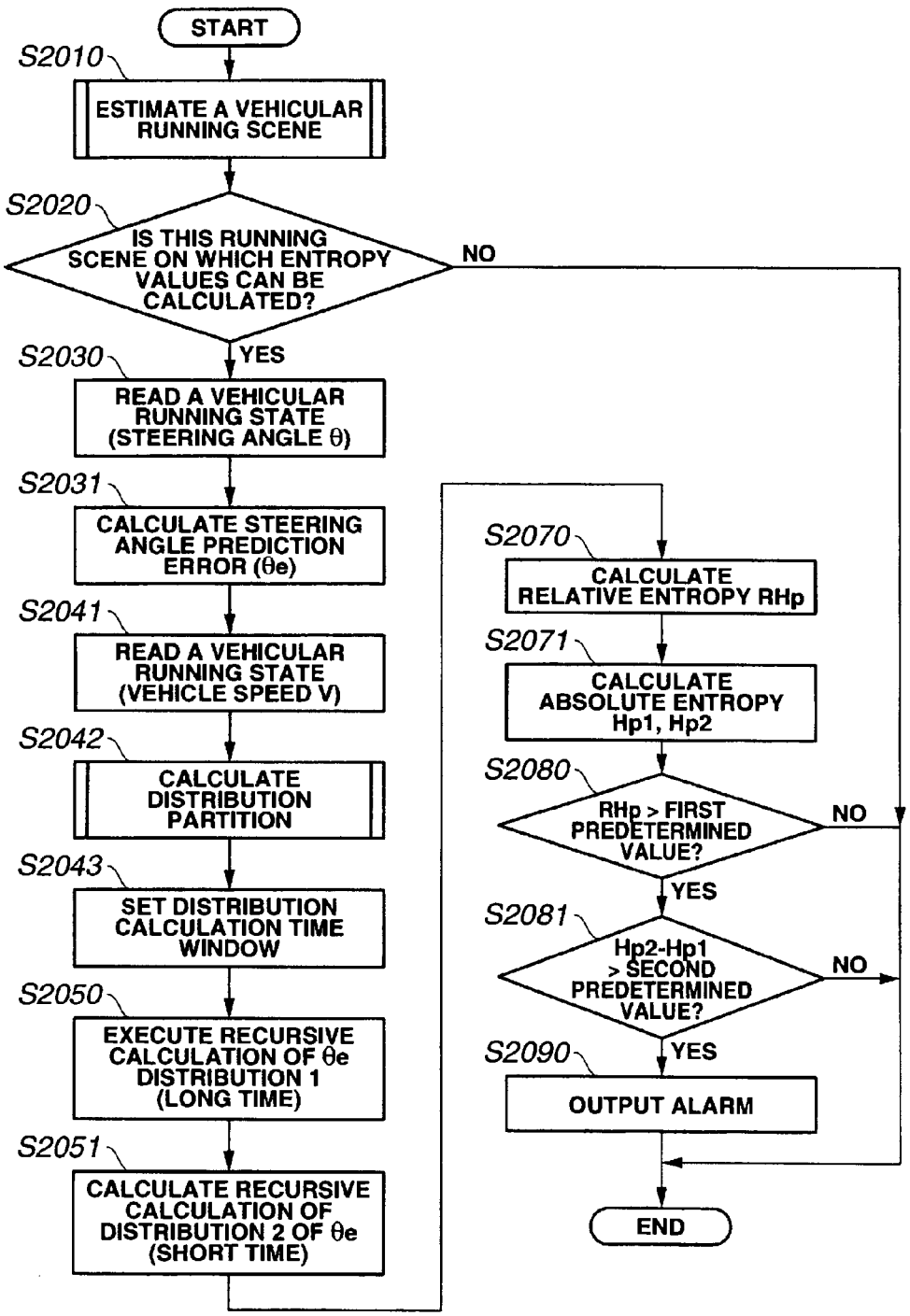

[Fig. 9]
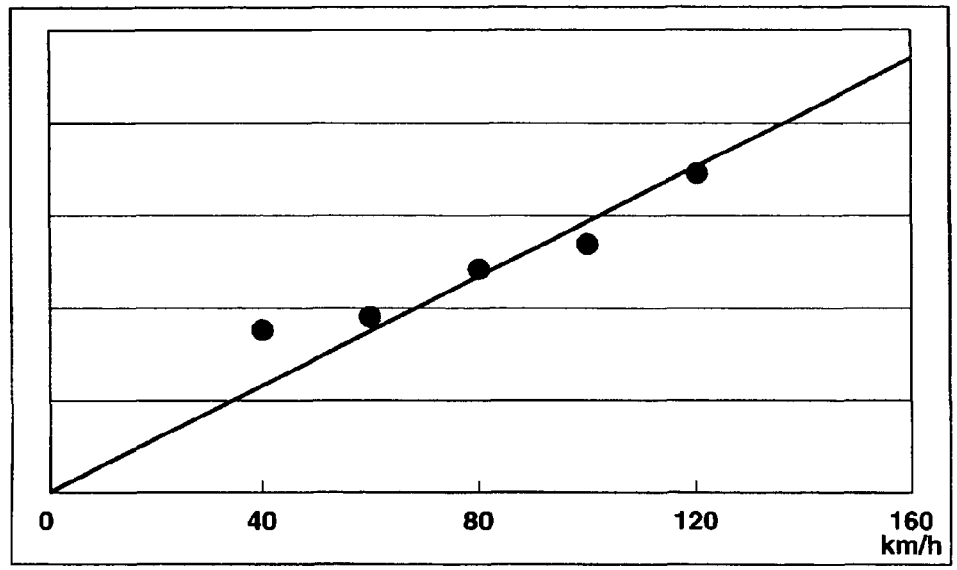
DEVIATION OF STEERING ANGLE PREDICTION ERROR
STANDARD DEVIATION OF PREDICTION ERROR
WITH RESPECT TO VEHICLE SPEED V
(STABLE RUNNING STATE)
[Fig. 10]
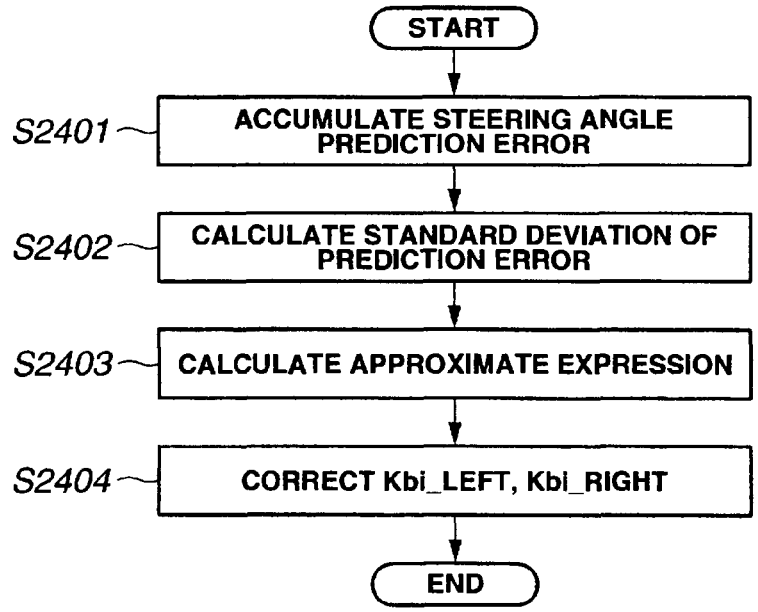

[Fig. 11]
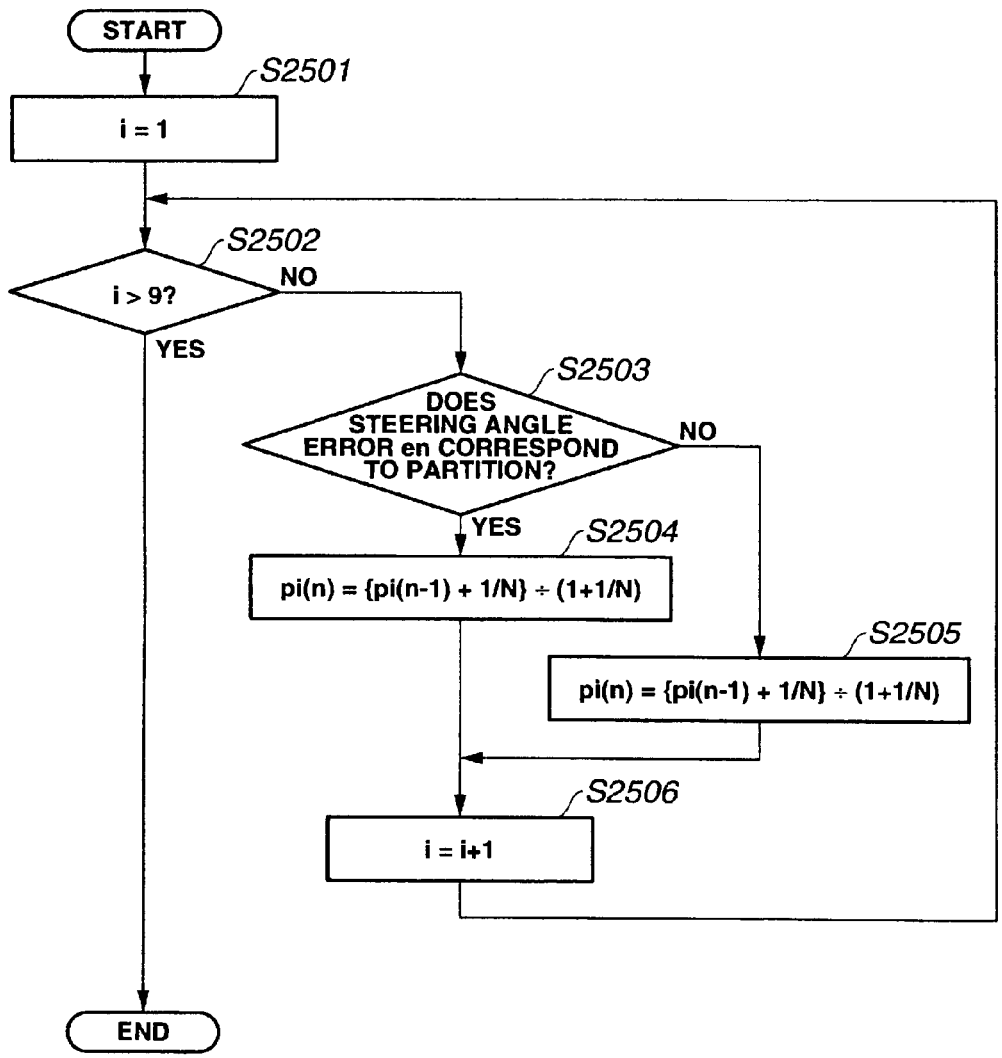

[Fig. 12]
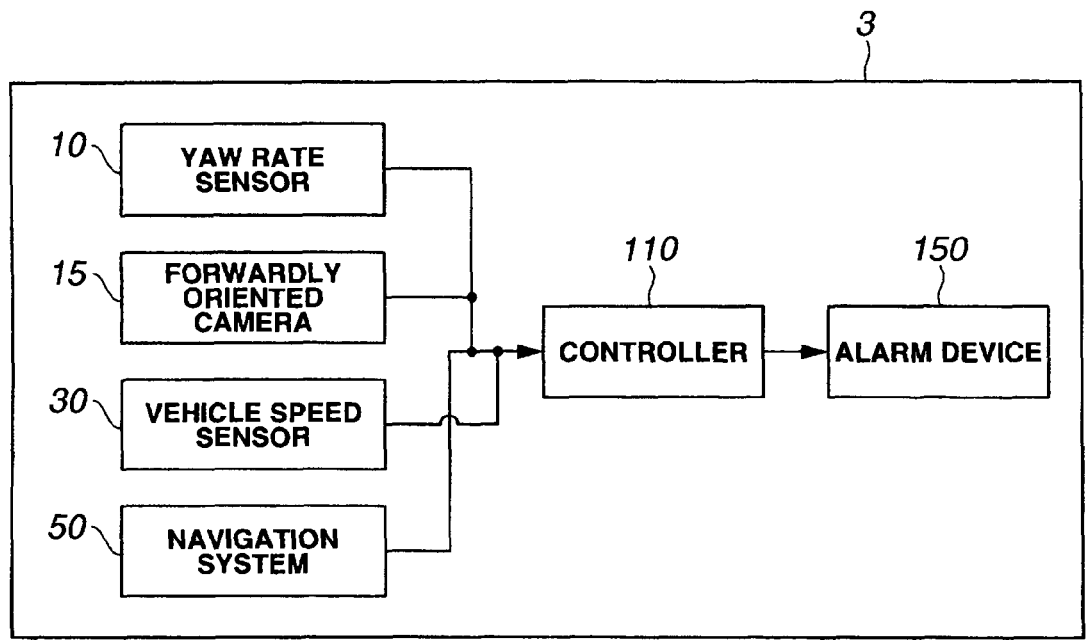

[Fig. 13]
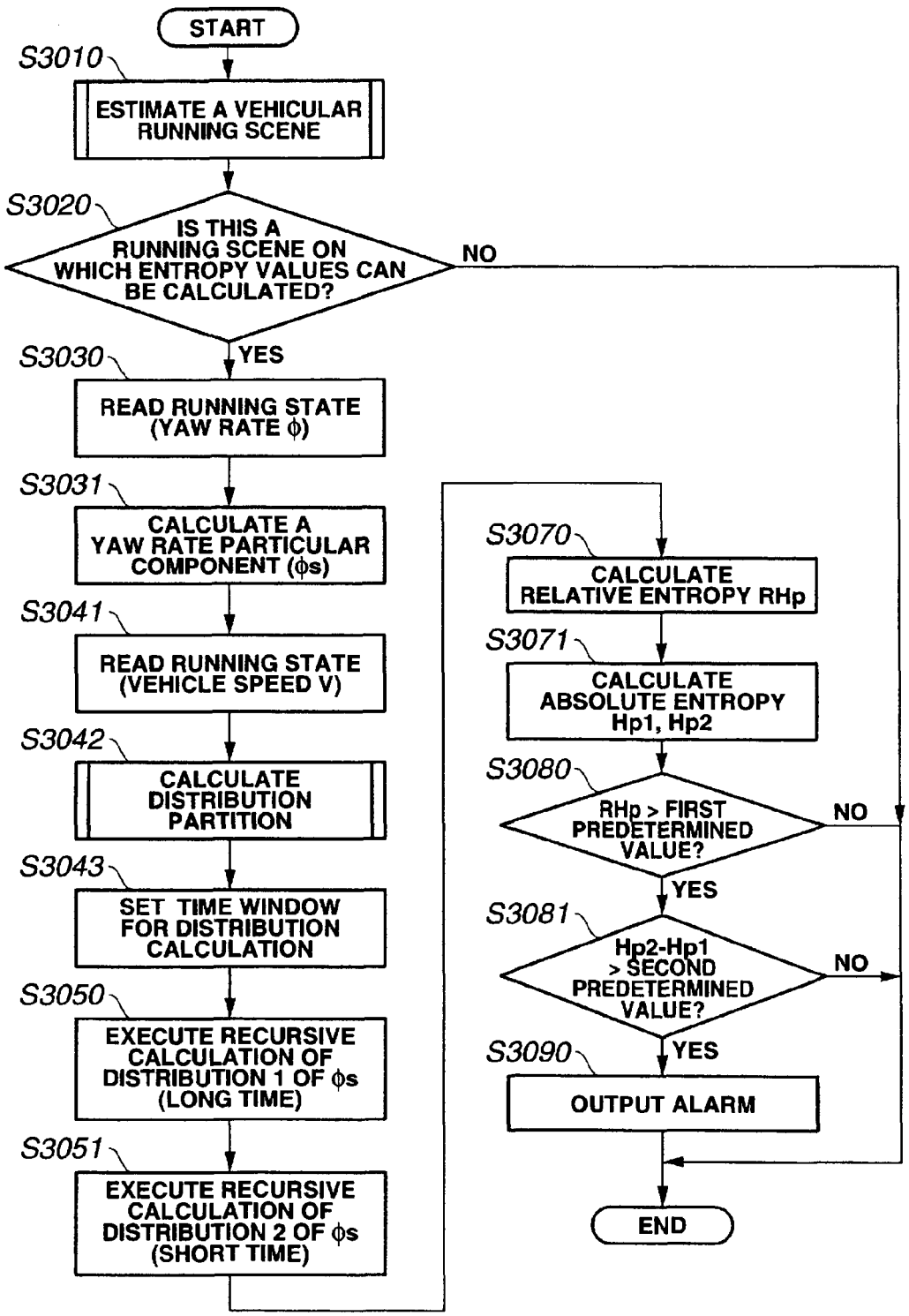

[Fig. 14]
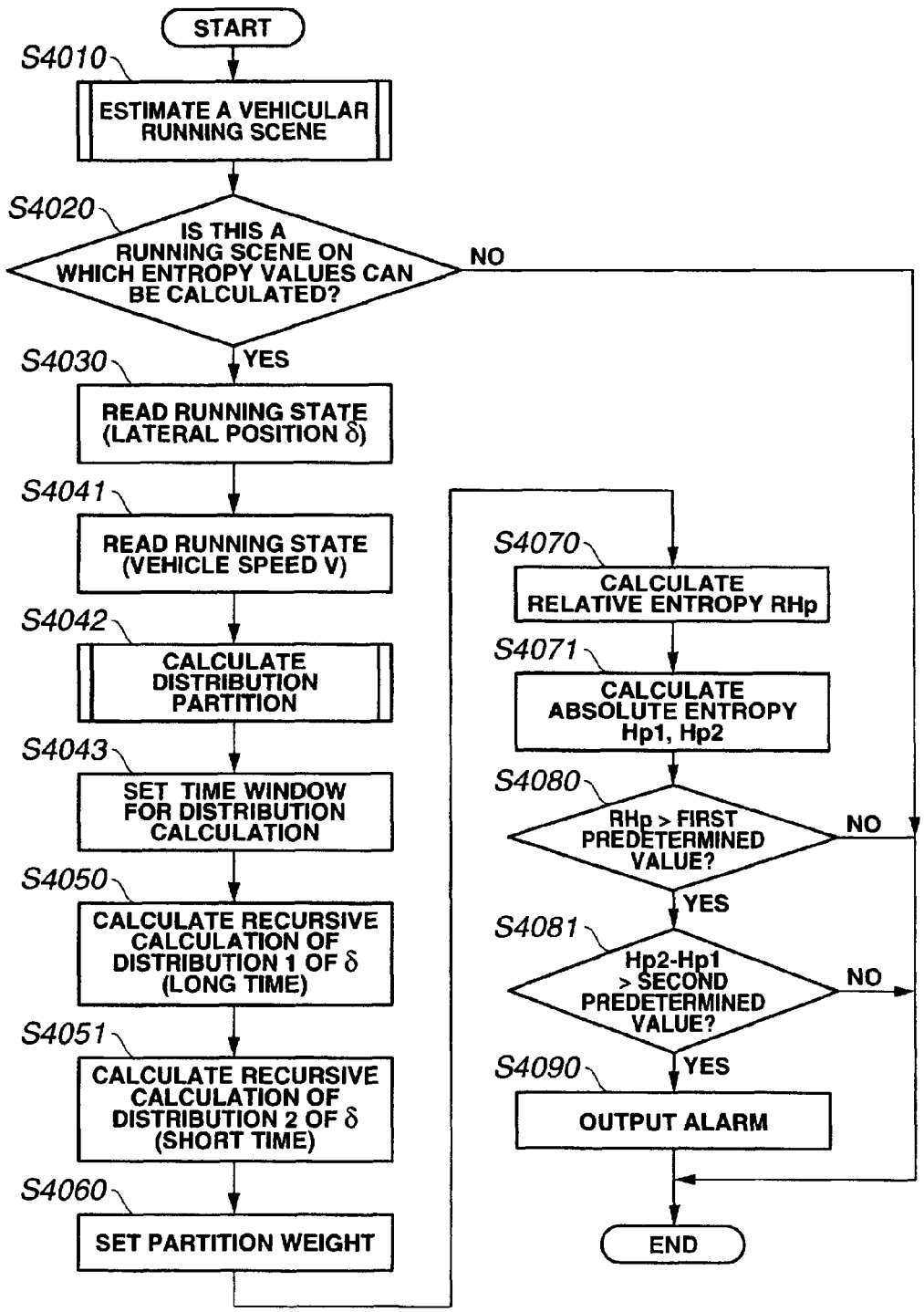

[Fig. 15]
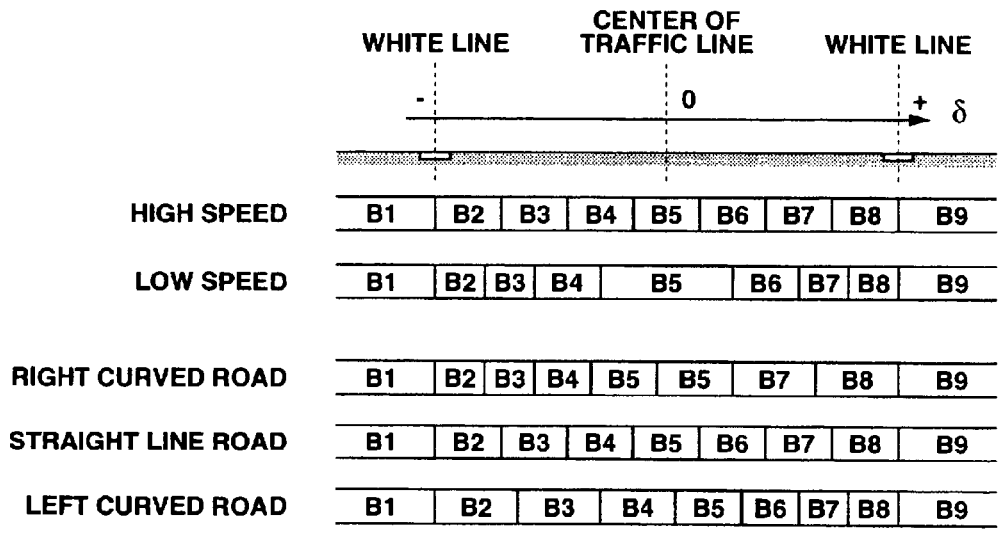
[Fig. 16]
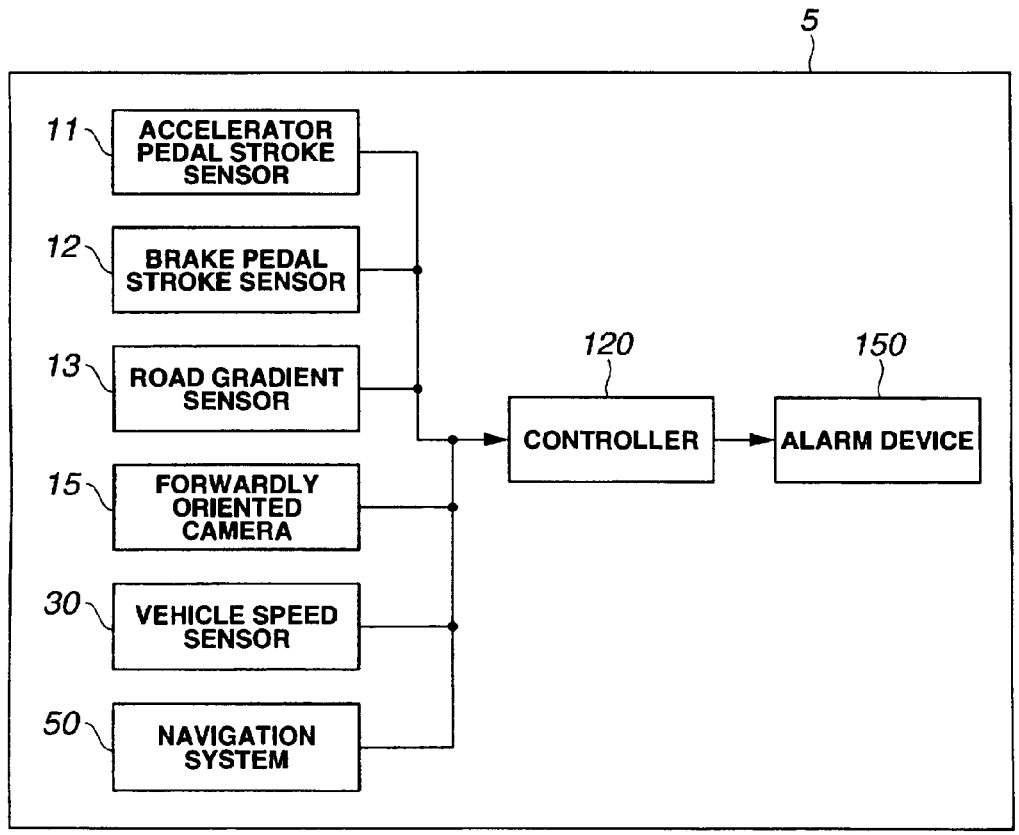

[Fig. 17]
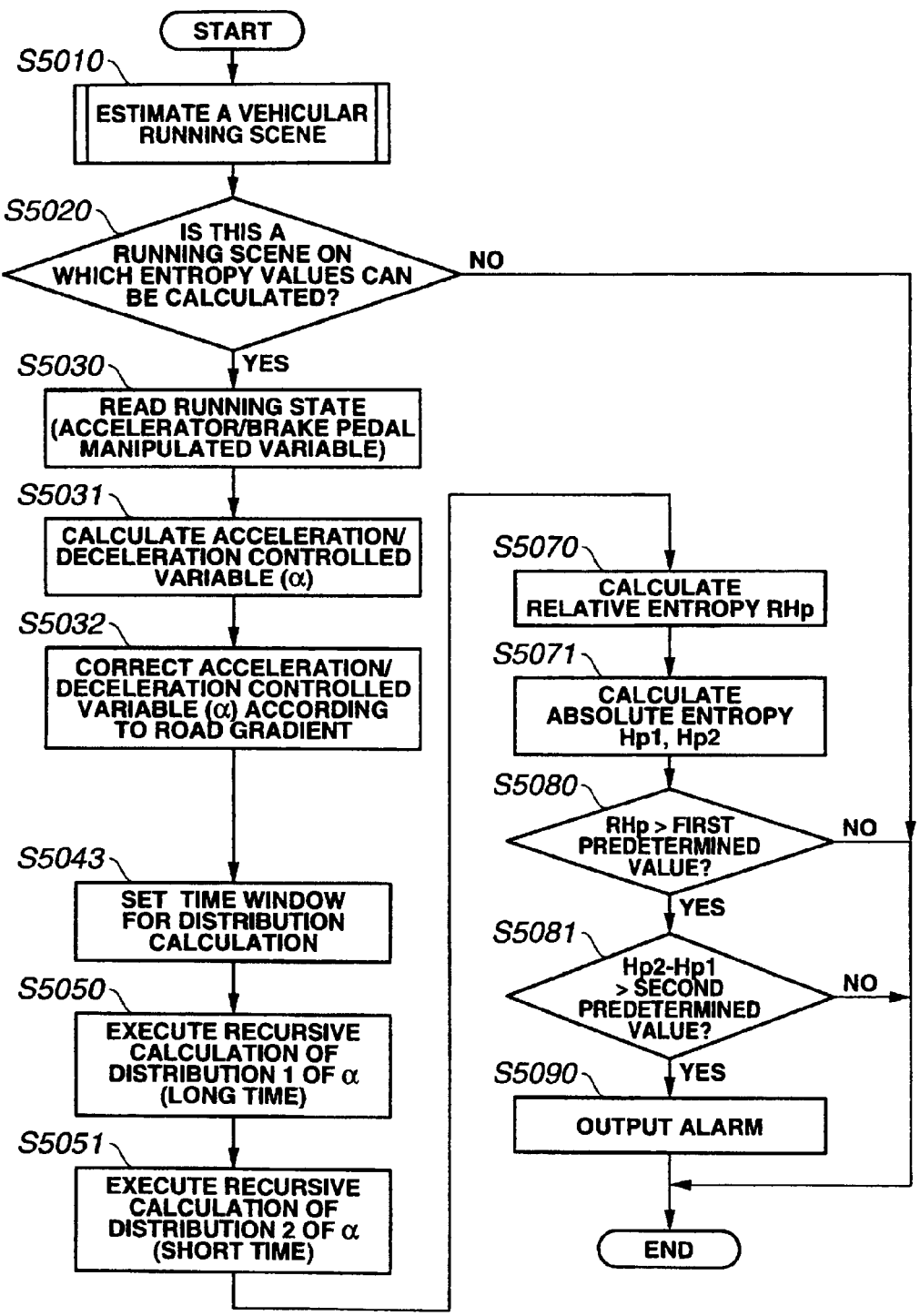

[Fig. 18]
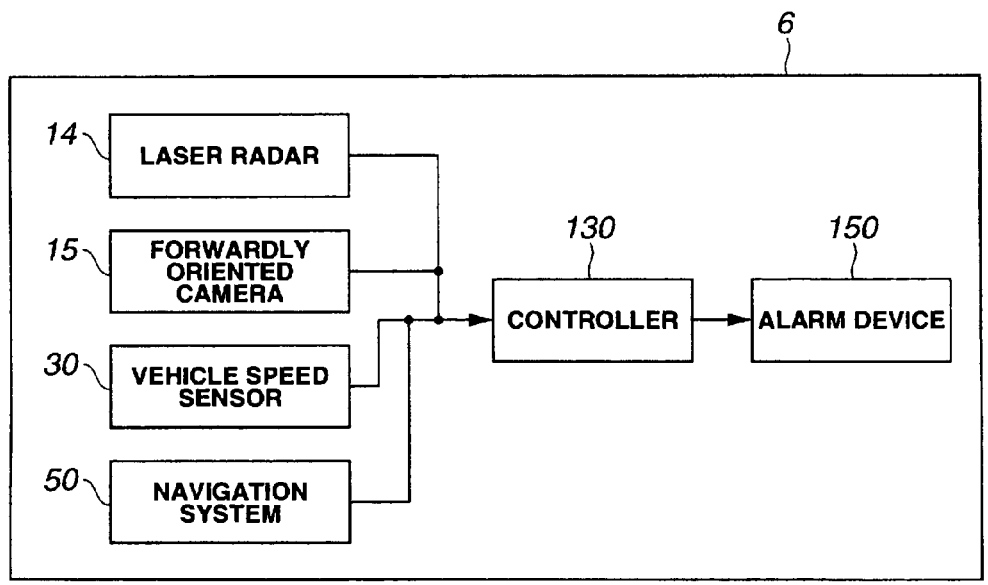

[Fig. 19]
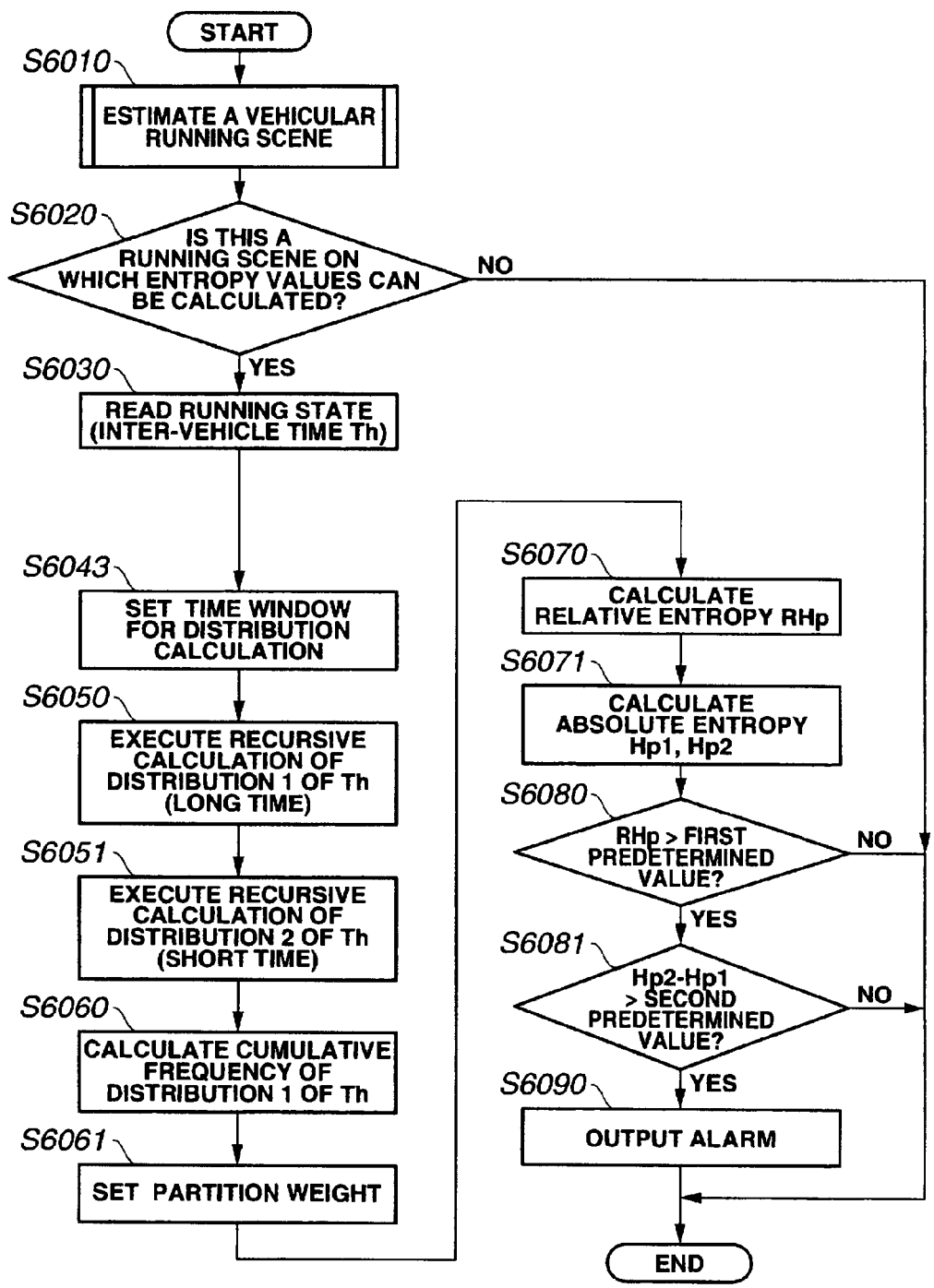

[Fig. 20]
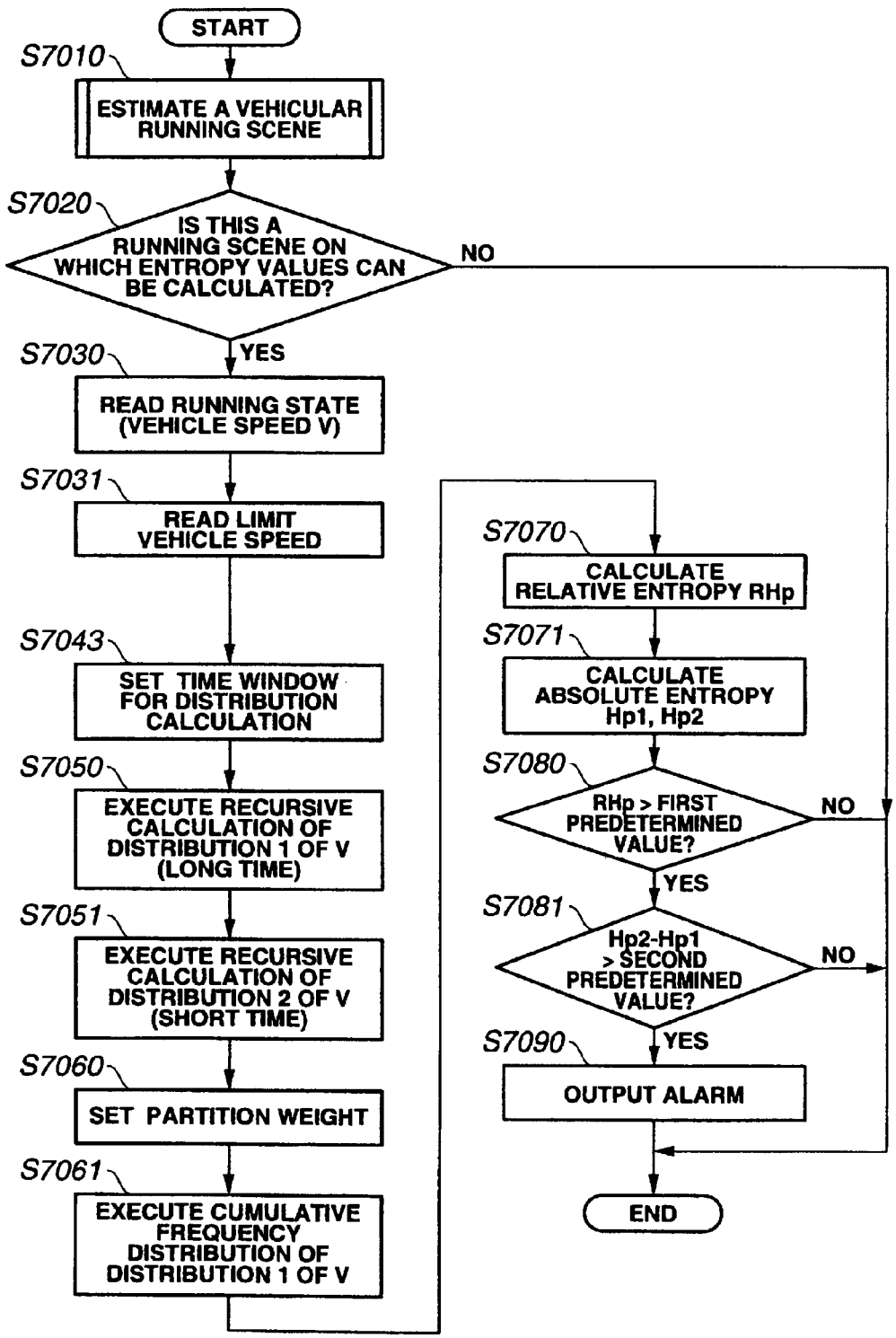

VEHICULAR DRIVING SUPPORT APPARATUS AND METHOD AND VEHICLE EQUIPPED WITH VEHICULAR DRIVING SUPPORT APPARATUS

TECHNICAL FIELD

The present invention relates to vehicular driving support apparatus and method for determining an operation of a vehicle driver and a vehicle equipped with the vehicular driving support apparatus.

BACKGROUND ART

A Japanese Patent Application Publication (tokkai) No. Heisei 11-227491 published on Aug. 24, 1999 exemplifies a previously proposed vehicular driving operation monitor apparatus which detects an unstable state of a driving operation of a vehicle driver and performs an alarming for the vehicle driver upon a detection of the unstable state. As a technique to calculate an unstability of the driving operation from a smoothness of a steering operation, the previously proposed vehicular driving operation monitor apparatus makes use of a steering entropy method. In the steering entropy method, attention is paid to such a characteristic that a time duration during which the steering operation is not carried out by the vehicle driver, under a load state under which the vehicle driver does not concentrate on the driving of the vehicle due to a load other than the driving, becomes longer than that of an ordinary driving state (an awakened state under no load state), large steering angle errors are accumulated, and a corrected steering quantity becomes large when the vehicle driver returns to pay attention to the driving. The previously proposed driving operation monitor apparatus disclosed in patent literature 1 detects the unstability of the vehicle driver on a basis of a steering entropy value calculated using the steering entropy method described above. Other previously proposed driving support (vehicular driving operation monitor) apparatuses are disclosed in Japanese Patent Application Publications (tokkai)) No. Heisei 8-249600 published on Sep. 27, 1996 and No. 2002-154345 published on May 28, 2002.

DISCLOSURE OF INVENTION

In the apparatus described in the above-described Japanese Patent Application Publication No. Heisei 11-227491, it is necessary to derive a distribution width ((alpha) value) of a steering angle prediction error in the ordinary state as a reference state in order to calculate the steering entropy value corresponding to an individual difference. However, this reference state is determined to have only one meaning under a particular running condition. The entropy value representing accurately the load of the vehicle driver cannot often be obtained according to a difference in traffic environment due to such different conditions as a running date, a running time, and a location (a road state) and it is often difficult to detect the state of the vehicle driver accurately. It is, hence, an object of the present invention to provide vehicular driving support apparatus and method which are capable of detecting accurately a vehicle driver's unstable state irrespective of the difference in traffic environment and to provide a vehicle equipped with the vehicular driving support apparatus according to the present invention.

According to one aspect of the present invention, there is provided a vehicular driving support apparatus, comprising: a running state detecting section configured to detect a running state of a vehicle; a running state distribution calculating section configured to calculate a plurality of running state distributions on a basis of the running state detected by the running state detecting section; a distribution difference quantity calculating section configured to calculate a difference quantity between the plurality of running state distributions by the running state distribution calculating section; and an unstable driving state detecting section configured to detect an unstable driving state from a magnitude of the difference quantity calculated by the distribution difference quantity calculating section.

According to another aspect of the present invention, there is provided a vehicular driving support method, comprising: detecting a running state of a vehicle; calculating a plurality of running state distributions on a basis of the detected running state data; calculating a difference quantity between the calculated plurality of running state distributions; and detecting an unstable driving state from a magnitude of the calculated difference quantity.

According to a still another aspect of the present invention, there is provided a vehicle equipped with a vehicular driving support apparatus comprising: a running state detecting section configured to detect a running state of a vehicle; a running state distribution calculating section configured to calculate a plurality of running state distributions on a basis of the running state detected by the running state detecting section; a distribution difference quantity calculating section configured to calculate a difference quantity between the plurality of running state distributions calculated by the running state distribution calculating section; and an unstable driving state detecting section configured to detect an unstable driving state from a magnitude of the difference quantity calculated by the distribution difference quantity calculating section.

According to the present invention, the unstable driving state of the vehicle driver can accurately be detected irrespective of the traffic environment of the vehicle.

BRIEF DESCRIPTION OF THE DRAWINGS

FIG. 1 is a system configuration view of a vehicular driving support apparatus in a first preferred embodiment according to the present invention.

FIG. 2 is a configuration view of a host vehicle in which the vehicular driving support apparatus shown in FIG. 1 is mounted.

FIG. 3 is a flowchart representing a procedure of a driving support control program in the first embodiment shown in FIG. 1.

FIG. 4 is an explanatory view of explaining symbols used to calculate a relative entropy.

FIG. 5 is an explanatory view for calculating past or long-time distribution and the distribution immediately before the present time from the steering angle prediction error data.

FIG. 6 is an explanatory view for explaining a calculation method of the relative entropy.

FIG. 7 is an explanatory view for explaining partitions of a steering angle prediction error.

FIG. 8 is a flowchart representing a procedure of a driving support control program in a second preferred embodiment according to the present invention.

FIG. 9 is a characteristic graph for explaining a relationship between the vehicle speed and the steering angle prediction error.

FIG. 10 is a flowchart representing a range of the partitions of the steering angle prediction error in accordance with the vehicle speed of the host vehicle.

FIG. 11 is a flowchart for explaining a recursive method of calculating a probability of each of partitions using the steering angle prediction error.

FIG. 12 is a system configuration view of the vehicular driving support apparatus in a third preferred embodiment according to the present invention.

FIG. 13 is a flowchart representing the procedure of the driving support control program in the third embodiment shown in FIG. 12.

FIG. 14 is a flowchart representing the procedure of the driving support control program in a fourth preferred embodiment according to the present invention.

FIG. 15 is an explanatory view for explaining a method of modifying a width of each partition of a lateral position within a traffic lane.

FIG. 16 is a system configuration view of the vehicular driving support apparatus in a fifth preferred embodiment according to the present invention.

FIG. 17 is a flowchart representing the procedure of the driving support control program in the fifth embodiment.

FIG. 18 is a system configuration view representing the vehicular driving support apparatus in a sixth preferred embodiment according to the present invention.

FIG. 19 is a flowchart representing a procedure of the driving support control program in the sixth embodiment.

FIG. 20 is a flowchart representing the procedure of the driving support control program in a seventh preferred embodiment according to the present invention.

EXPLANATION OF REFERENCE

5: steering angle sensor, 10: yaw rate sensor, 11: accelerator pedal stroke sensor, 12: brake pedal stroke sensor, 13: road gradient sensor, 14: laser radar, forward oriented camera, 15: forwardly oriented camera, 30: vehicle speed sensor, 50: navigation system, 100, 110, 120, 130: controller, 150: alarm device.

BEST MODE FOR CARRYING OUT THE INVENTION

Reference will, hereinafter, be made to the drawings in order to facilitate better understanding of the present invention.

First Embodiment

A vehicular driving support apparatus in a first preferred embodiment according to the present invention will be described below. FIG. 1 shows a system configuration view of vehicular driving support apparatus 1 in a first preferred embodiment according to the present invention and FIG. 2 shows a configuration view of a vehicle (hereinafter also called, a host vehicle) in which vehicular driving support apparatus 1 in the first embodiment according to the present invention is mounted.

First, the structure of vehicular driving support apparatus 1 in the first embodiment according to the present invention will be described. A steering angle sensor 5 is an angle sensor attached in a proximity to, for example, a steering column or a steering wheel (not shown) of a vehicular steering system and detects a steering angle (a steering angular displacement) according to a steering operation of a vehicle driver from a revolution (angular displacement) of a steering shaft of the vehicular steering system. The detected steering angle is outputted to a controller 100.

A forwardly oriented camera 15 is a small-sized CCD (Charge Coupled Device) camera or CMOS (Complementary Monolithic Oxide Semiconductor) camera attached onto an upper portion of a front windshield of the host vehicle and detects a situation of a forward detection zone (a forward road) in a form of its image. Controller 100 performs an image processing for an image signal from forwardly oriented camera 15 and detects a lane marker or so forth present in the forward detection zone (forward road) of the host vehicle in which vehicular driving support apparatus 1 in the first embodiment is mounted. It should be noted that the forward detection zone by forwardly oriented camera 15 is about plus-or-minus 30 degrees in a horizontal direction with respect to a center line of a forward-and-backward (longitudinal) direction of the host vehicle and a forward road scenery included in this zone is captured in a form of its image.

A vehicle speed sensor 30 detects a vehicle speed of the host vehicle by measuring revolution speeds of road wheels or a revolution speed of an output shaft of a vehicular transmission and outputs the detected vehicle speed to controller 100.

A navigation system 50 is equipped with a GPS (Global Positioning System) receiver, a road map data base, a display monitor, and so forth and performs a route search and a route guidance. Navigation system 30 can provide information such as a kind of road on which the host vehicle is running, a road width, and so forth on the basis of a present position of the host vehicle obtained from the GPS receiver and a road information stored in the road map data base.

Controller 100 is an electronic control unit constituted by a CPU (Central Processing Unit) and CPU peripheral parts such as a ROM (Read Only Memory) and a RAM (Random Access Memory) and performs a whole control of vehicular driving support apparatus 1. Controller 100 analyzes a driving characteristic of the vehicle driver on the basis of signals inputted from steering angle sensor 5, forwardly oriented camera 15, vehicle speed sensor 30, navigation system 50, and so forth and determines a randomness of the driving operation by the vehicle driver, viz., a degree of un-smoothness of the driving operation. Then, an alarm is outputted in accordance with the degree of un-smoothness of the driving operation to pay attention to the vehicle driver. A specific control content in controller 100 will be described later.

An alarm device 150 issues the alarming in accordance with a control signal from controller 100. Alarm device 150 is equipped with, for example, a speaker to perform an information provision for the vehicle driver using a buzzer sound or vocal sound and a display unit performing the information provision through the image or display of a text. The display unit can perform the display using the display monitor of navigation system 50.

Next, an operation of vehicular driving support apparatus 1 in the first embodiment will be described. First, an outline of vehicular driving support apparatus 1 will be described. Controller 100 of vehicular driving support apparatus 1 determines the degree of the un-smoothness of the driving operation by the vehicle driver on a basis of the running state of the host vehicle and the driving operation of the vehicle driver and performs the alarming for the vehicle driver in accordance with the result of determination described above. Specifically, controller 100 determines how the present driving operation by the vehicle driver is different from an ordinarily carried out driving operation, namely, whether the present driving operation indicates an unstable state as compared with the ordinarily carried out driving operation on a basis of a steering angle signal when the driver performs the steering operation. Then, if controller 100 determines that the present driving state of the vehicle driver indicates the unstable state as compared with the ordinarily carried out driving operation, the alarming is outputted to call attention to the vehicle driver.

In the first embodiment, a relative entropy is calculated as a value representing the un-smoothness of the driving operation, viz., the randomness thereof. In general, under a state in which the attention of the vehicle driver is not concentrated on the driving, a time duration for which the steering operation is not carried out becomes longer than a time duration for which the vehicle driver has normally concentrated on the driving of the vehicle and a large error of the steering angle is stored (accumulated). Hence, a correction steering quantity when the attention by the vehicle driver is returned to the driving operation becomes accordingly large. Then, controller 100 calculates relative entropy RHp utilizing this characteristic. Specifically, a (long time) steering error distribution stored for a long time past or before the present steering error and a present steering error distribution of the vehicle driver measured for a short time are respectively calculated.

Then, using the (long time) steering error distribution for the long time as a standard criterion, relative entropy RHp is calculated from the long time steering error distribution and the present steering error distribution for the short time.

That is to say, relative entropy RHp is a physical quantity representing a difference quantity (variable) (namely, distance) between the two steering angle error distributions, namely, the degree of the difference between the two steering angle error distributions, viz., how far the two steering distributions are separated from each other.

By determining the value of calculated relative entropy RHp, a stability of the running state immediately before the present steering angle error with respect to the running state for the past long time duration is evaluated.

An operation of vehicular driving support apparatus in the first embodiment will be described in details with reference to FIG. 3. FIG. 3 shows a flowchart representing a procedure of a driving support control process executed by controller 100 in the first embodiment. The processing content shown in FIG. 3 is carried out continuously whenever a constant period of time has passed, for example, whenever 50 milliseconds have passed.

At a step S1010, controller 100 executes an estimation (or a detection) of a running scene on which the host vehicle is running in order to determine whether the present running scene (this) is a running scene on which relative entropy RHp can be calculated. In this embodiment, a case where vehicle speed V of the host vehicle falls in a predetermined range (for example, 40 km/h through 120 Km/h) of the vehicle speed is assumed to be the running scene on which relative entropy RHp can be calculated. That is to say, in order to perform an effective calculation of relative entropy RHp using the steering angle signal, cases where vehicle speed V is extremely slow and where vehicle speed V is extremely fast are excluded from the running scene on which relative entropy RHp can be calculated.

At a step S1020, controller 100 determines whether present host vehicle speed V falls in the predetermined range detected by vehicle speed sensor 30. If controller 100 determines that host vehicle speed V falls in the predetermined range and the present running scene is the running scene on which relative entropy RHp can be calculated, the routine goes to a step S1030. If controller 100 determines that host vehicle speed V does not fall within predetermined range, the present routine is ended.

At a step S1030, controller 100 reads present steering angle signal (theta) as a driving manipulated variable of the vehicle driver which is an object to be detected to detect an unstable state of the driving operation of the vehicle driver. At a step S1031, controller 100 calculates steering angle prediction error (theta)e from read steering angle value (theta).

It is herein noted that FIG. 4 shows special symbols and their names used to calculate relative entropy RHp. A steering angle smoothed value (theta)n-tilde is a steering angle on which an influence of a quantamization (quantizing) noise is reduced. An estimated value (theta)n-hat of the steering angle is a value of the estimation of the steering angle at a sampling point of time supposing that the steering wheel was smoothly operated. Steering angle estimated value (theta)-hat is obtained by performing a second-order Taylor's expansion for steering angle smoothed value (theta)-tilde as expressed in the following equation (1) described below.

[Math. 1]

$$\hat{\theta}_n = \tilde{\theta}_{n-1} + (t_n - t_{n-1}) + \frac{(t_n - t_{n-1})}{2}\left(\frac{\tilde{\theta}_{n-1} - \tilde{\theta}_{n-2}}{t_{n-1} - t_{n-2}} - \frac{\tilde{\theta}_{n-2} - \tilde{\theta}_{n-3}}{t_{n-2} - t_{n-3}}\right) \quad \text{(Equation (1))}$$

In equation (1), $t_n$, denotes a sampling time point of steering angle (theta)n and n=1, 2, 3, - - -, k, - - -, n.

Steering angle smoothed value (theta)n-tilde is calculated from the following equation (equation (2)) as a mean value of three mutually adjacent steering angles (theta)n to reduce the influence of the quantizing noise.

[Math. 2]

$$\tilde{\theta}_{n-k} = \frac{1}{3}\sum_{i=-1}^{1} \theta_{n-kl+i} \quad \text{(Equation (2))}$$

In equation (2), l denotes a number of sampled steering angles (theta)n included within 150 milliseconds in a case where a calculation time interval for steering angle smoothed value (theta)n-tilde is 150 milliseconds, namely, a case where the calculation time interval is a minimum time interval operable intermittently by a human kind in a manual operation. If the sampling interval of steering angle (theta)n is Ts, number of sampled steering angles (theta)n can be expressed in the following equation (3).

$$l=\text{round}(0.15/Ts) \quad \text{(Equation (3))}.$$

In equations (2) and (3), steering angle smoothed value (theta)n-tilde can be determined on a basis of the steering angle at the interval of 150 milliseconds and its adjacent totally three steering angles (theta)n from (k×1) in which k=1, 2, 3. Hence, estimated value of steering angles (theta)n-hat calculated on the basis of this smoothed value (theta)n-tilde is calculated from steering angle (theta) obtained substantially at the interval of 150 milliseconds.

Steering prediction error (theta)e at the sampling time point can be calculated from the following equation (4) as a difference between steering angle estimated value (theta)n-hat supposing that the steering operation was smoothly carried out and actual steering angle (theta)n.

[Math. 3]

$$\theta_e = \theta_n - \hat{\theta}_n \quad \text{(Equation (4))}$$

However, steering angle prediction error (theta)e is calculated only for steering angle (theta)n for each of 150 milliseconds which is the minimum time interval operable intermittently by the human kind. A specific calculation method of steering angle prediction error (theta)e will be described below. It should be noted that sampling interval Ts of steering angle signal (theta) is, for example, 50 milliseconds. First, three steering angle smoothed value (theta)n-tilde are calculated from equation (2) using three adjacent steering angles (theta)n at the interval of 150 milliseconds. The three steering angle smoothed values (theta)n-tilde are expressed in the following equation (5).

[Math. 4]

$$\tilde{\theta}_{n-1} = \frac{1}{3}(\theta_{n-4} + \theta_{n-3} + \theta_{n-2}),$$
$$\tilde{\theta}_{n-2} = \frac{1}{3}(\theta_{n-7} + \theta_{n-6} + \theta_{n-5}),$$
$$\tilde{\theta}_{n-3} = \frac{1}{3}(\theta_{n-10} + \theta_{n-9} + \theta_{n-8}),$$

(Equation (5))

Next, using calculated three steering angle smoothed values (theta)n-tilde, estimated value (theta)n-hat of steering angle from equation (1) is calculated. Thus, estimated value (theta)n-hat is expressed in the following equation (6).

[Math. 5]

$$\hat{\theta}_n = \tilde{\theta}_{n-1} + T_S \cdot \frac{\tilde{\theta}_{n-1} - \tilde{\theta}_{n-2}}{T_S} +$$
$$\frac{T_S}{2}\left(\frac{\tilde{\theta}_{n-1} - \tilde{\theta}_{n-2}}{T_S} - \frac{\tilde{\theta}_{n-2} - \tilde{\theta}_{n-3}}{T_S}\right)$$
$$= \tilde{\theta}_{n-1} + (\tilde{\theta}_{n-1} - \tilde{\theta}_{n-2}) +$$
$$\frac{1}{2}\{(\tilde{\theta}_{n-1} - \tilde{\theta}_{n-2}) - (\tilde{\theta}_{n-2} - \tilde{\theta}_{n-3})\}$$

(Equation (6))

Then, steering error (theta)e is calculated from equation (4) using calculated steering angle estimated value (theta)n-hat and actual steering angle signal (theta)n.

At the next step S1040, data of steering angle prediction error (theta)e for a predetermined time duration T (seconds) calculated up to the present point of time and stored within a memory (for example, RAM) of controller 100 is updated by adding the present value of steering angle prediction error (theta)e calculated at step S1031 to stored steering angle prediction error (theta)e. That is to say, with one of the data at T second before which is oldest from the stored (accumulated) steering angle prediction error (theta)e discarded, the present value calculated at step S1031 is inputted as the data of a newest steering angle prediction error (theta)e in place of the oldest steering angle prediction error. Thus, data of steering angle prediction error (theta)e from the present value to the second oldest data before T (seconds) is accumulated (stored). It should be noted that predetermined time duration T (sec.) is set approximately to T=3600 seconds (=one hour) in order for controller 100 to store a sufficiently long term data in the memory to calculate the long time prediction error distribution which is the standard criterion to determine the unstable state of the present driving operation.

At a step S1050, controller 100 performs a calculation of the past or long time steering angle prediction error distribution 1, which is the standard criterion of the steering angle prediction error distribution. In this embodiment, as shown in FIG. 5, controller 100 calculates the past steering angle prediction error distribution using the data for 180 seconds from the data before, for example, T seconds to the data obtained for 180 seconds after T seconds before. Specifically, stored past steering angle prediction error (theta)e are classified into nine prediction error partitions b1 through b9 and a probability pi of a frequency (=p1 through p9) of steering angle prediction error (theta)e included in each partition (classification) bi with respect to all frequencies is calculated. Then, the calculated past (prediction error) distribution is utilized as the standard criterion of the steering angle prediction error distribution. It should be noted that the range of prediction error partition bi is previously set to be constant for all partitions b1 through b9.

In a case where the long time steering angle prediction error distribution is calculated, all data for 3600 seconds from before T second up to the present time are used. Specifically, stored steering angle prediction error (theta)e for the long time is classified into nine prediction error partitions b1 through b9 and probability pi (=p1 through p9) of the frequency of steering angle prediction error (theta)e included in each partition bi with respect to all frequencies is derived. The calculated past distribution (or the long time distribution) is supposed to be a steering angle prediction error distribution 1 of the past (or long time) which is the standard criterion.

At a step S1051, controller 100 calculates present steering angle prediction error distribution 2. At this step, controller 100 calculates present steering angle distribution 2 using the data for 180 seconds from the present time up to the immediate time (180 seconds immediately) before the present time (now) as shown in FIG. 5. Specifically, the data of steering angle prediction error (theta)e for 180 seconds immediate time before the present time are classified into nine prediction error partitions b1 through b9 and probability qi (=q1 through q9) of the frequency of steering angle prediction error (theta)e included in each partition bi with respect to all frequencies is derived.

At a step S1070, relative entropy RHp is derived using past or long time steering angle prediction error distribution 1 and present steering angle prediction error 2. As shown in FIG. 6, relative entropy RHp is the difference quantity (distance) of present steering angle prediction error distribution 2 with respect to steering angle prediction error distribution 1 of the past (or long time) which is the standard criterion. Relative entropy RHp can be calculated from the following equation (equation (7)).

[Math. 6]

$$RHp = \sum q_i \cdot \log_9 \frac{q_i}{p_i}$$

(Equation (7))

Relative entropy RHp indicates that RHp=0 in a case where probability pi of past steering angle prediction error distribution 1 or that for the long time is equal to probability qi of present steering angle prediction error distribution 2 and as probabilities of pi and qi become deviated from each other, value of relative entropy RHp becomes increased.

At a step S1080, controller 100 compares a value of relative entropy RHp calculated at step S1070 with a predetermined value. It should be noted that the predetermined value is a threshold value to determine whether the present driving operation of the vehicle driver is in the unstable state and it is necessary to call attention to the vehicle driver and is preset to an appropriate value. If relative entropy RHp is larger than the predetermined value, the routine goes to a step S1090. If relative entropy RHp is equal to or smaller than the predetermined value (No) at step S1080, the present routine is ended.

At step S1090, controller 100 outputs the alarm to call attention to the vehicle driver. Controller 100 transmits the control signal to alarm device 150 to inform the vehicle driver that the driving operation is in the unstable state through the alarm sound or the display. Then, the present processing is ended.

It should be noted that a range of prediction error partition bi to calculate past (or long time) steering angle prediction error distribution 1 and present steering angle prediction error distribution 2 can be set on a basis of an (alpha) value used when steering entropy value Hp representing an ambiguousness (or uncertainty) of the steering angle error distribution. It should also be noted that (alpha) value is a calculation of 90-percent tile value (a range of distribution in which 90-percent steering error is included) with a difference between the estimated value of the steering angle in the case where the steering operation was smoothly carried out and the actual steering angle (namely, the steering angle error within the constant time) derived on a basis of a time series data of the steering angle.

It should, herein, be noted that (alpha) value is calculated on a basis of the past or long time steering angle error distribution and the same range of prediction error partition bi for the past (or long time) steering angle prediction error distribution 1 and present steering angle prediction error distribution 2 is set. FIG. 7 shows a range of steering angle prediction error (theta)e of each partition bi set using (alpha) value. It should be noted that symbol of (alpha) used in this embodiment and in FIG. 7 is different from that of a controlled variable of vehicular acceleration/deceleration which will be described later.

As described above, the first embodiment of the vehicular driving support apparatus according to the present invention can have the following actions and advantages.

(1) Vehicular driving support apparatus 1 detects at least one of the vehicular dynamic motion, the vehicle surrounding environment, and the vehicle driver driving manipulated variable, as the running state data and calculates a plurality of running state distributions on the basis of the running state data. Then, vehicular driving support apparatus 1 calculates the difference quantity between the calculated plurality of running state distributions and determines the unstable state of the vehicle driver from the magnitudes of the difference quantity. Thus, it becomes possible to detect the unstable running state with a high accuracy irrespective of the difference in the traffic environment. That is to say, the unstable state of the vehicle driver can be detected with the high accuracy conforming to a personal ordinarily carried out characteristic.

(2) As the plurality of running state distributions, the plurality of running state distributions in which the time range is different from each other are calculated. For example, the running state distribution including the past running state data and the running state distribution including the running state data at the time point immediately before the present time point are calculated and the difference quantity of the running state distribution at the time point immediately before the present time point with the past running state distribution as the standard criterion is directly calculated. Thus, it becomes possible to evaluate the stability of the state at the time point immediately before the present time point while the date to be the standard criterion is continuously updated. In this way, the unstable running state can be detected with the high accuracy irrespective of the difference in the traffic environment.

(3) Since the steering angle prediction error is obtained as the running state data, the unstable driving state on the driving operation of the vehicle driver can be determined.

(4) The relative entropy as the difference quantity between the plurality of running state distributions is calculated. Thus, with the difference in profiles of the plurality of distributions grasped, how far one of the running state distributions to be compared with the other thereof is separated from the standard criterion (reference) running state distribution can be determined.

Second Embodiment

Next, the vehicular driving support apparatus in a second preferred embodiment according to the present invention will be described below. A basic structure of the vehicular driving support apparatus in the second preferred embodiment according to the present invention is the same as those described in the first embodiment shown in FIG. 1. Hereinafter, difference points of the second embodiment from the first embodiment will chiefly be described.

In vehicular driving support apparatus 1 of the second embodiment, the unstable state of the driving operation is detected by calculating relative entropy RHp using steering angle signal (theta)e. Then, when determining that the driving operation indicates the unstable state, the alarming is issued to call attention to the vehicle driver.

In determining relative entropy RHp, controller 100 is needed to determine to which partition of nine partitioned reference distributions the estimated error of the steering angle belongs and to calculate the probability of each partition. In the first embodiment described above, a large quantity of data of steering angle (theta) needed to calculate relative entropy RHp is stored into the memory of controller 100. On the other hand, even in a case where the data of steering angle (theta) at the time point immediately before the present time point is needed to temporarily be stored, the probability of each partition is calculated in a recursive manner in order for the calculation of probability at each partition to be enabled in a small quantity of memory areas.

In addition, even though a state under which the host vehicle is stably running, there is a tendency that deviations of steering angle prediction errors (theta)e becomes larger, as vehicle speed V of the host vehicle becomes faster (larger). Hence, in the second embodiment, in order to correct the influence of the deviations, the range of partition bi of the steering angle prediction error is corrected in accordance with vehicle speed V of the host vehicle.

Furthermore, in order to determine more accurately the unstable state on the driving operation of the vehicle driver, in addition to relative entropy RHp, a steering entropy value Hp representing the ambiguousness (uncertainty) of the steering error distribution is calculated for each of past (or long time) steering angle prediction error distribution 1 and present steering angle prediction error distribution 2. Steering entropy value Hp becomes small in a case where the steering operation is smooth and stable and becomes large in a case where the steering operation is unsmooth (or rough) and unstable. Hereinafter, steering entropy value Hp is called an absolute entropy against relative entropy RHp.

Hereinbelow, the operation of vehicle driving support apparatus 1 in the second embodiment will be described with reference to FIG. 8. FIG. 8 is an operational flowchart representing a procedure of the driving support control executed in controller 100 in the second embodiment. In this procedure, the control is continuously executed for each control interval of time, for example, 50 milliseconds. Processes at steps S2010 through S2031 are the same as steps S1010 through S1031 shown in the flowchart of FIG. 3. Hence, the detailed explanations thereof will, herein, be omitted.

At a step S2041, controller 100 reads present vehicle speed V detected by vehicle speed sensor 30 as the physical quantity representing the running state of the host vehicle used to determine the range of partition bi of the steering angle prediction error distribution. At a step S2042, controller 100 sets position and magnitude of a width of partition bi of the steering angle prediction error distribution in accordance with vehicle speed V read at step S2041. That is to say, as shown in FIG. 9, there is a tendency that, even if the host vehicle is stably running, as vehicle speed V of the host vehicle becomes faster (larger), the deviations of steering angle prediction error (theta)e become larger. Therefore, in order to correct the influence of the deviations according to the vehicle speed, the range of each partition bi is modified as expressed in the following equation (8).

Range of partition bi: $[Kbi\_LEFT \times V, Kbi\_RIGHT \times V]$ (Equation (8))

In equation (8), Kbi_LEFT and Kbi_RIGHT define left and right ends of each of nine partitions b1 through b9. That is to say, Kbi_RIGHT defining the right end of partition bi (i=1 through 9) is made equal to Kbi+1_LEFT defining the left end of partition bi+1. These Kbi_LEFT and Kbi_RIGHT are previously set (preset) to appropriate values as predetermined values. According to equation (8), the position and magnitude of the range of each partition bi are varied in proportion to vehicle speed V of the host vehicle.

In addition, since values of Kbi_LEFT and Kbi_RIGHT are expected to be different according to the characteristic of the host vehicle and that of the vehicle driver, these values are corrected using an appropriate equation (an approximate expression) having a magnitude of a deviation (a standard deviation) of a steering angle prediction error (theta)e identified for each vehicle speed area by another program. That is to say, the characteristic of the vehicle driver is learned from the deviations of steering angle prediction error (theta)e to correct values of Kbi_LEFT and Kbi_RIGHT. FIG. 9 shows an example of the standard deviation of steering angle prediction error (theta)e with respect to vehicle speed V under the stable running state. Values of Kbi_LEFT and Kbi_RIGHT are corrected using the approximate expression represented in a straight line shown in FIG. 9. A method of corrections of values of Kbi_LEFT and Kbi_RIGHT will be described below with reference to a flowchart of FIG. 10.

First of all, at a step S2401, controller 100 stores data of steering angle prediction error (theta)e calculated during the run of the host vehicle at each interval of vehicle speed of 10 Km/h within the range of vehicle speed of (plus-or-minus) 5 Km/h separately into each of memory areas within controller 100. At the next step S2402, controller 100 calculates standard deviation of steering angle prediction error (theta)e within each range using past stored steering angle prediction error (theta)e. Each plotted point in FIG. 9 is an example of the standard deviation of steering angle prediction error (theta)e calculated for each area of vehicle speed V of the host vehicle. It should, herein, be noted that the example shown in FIG. 9 is plotted for each vehicle speed range of 20 Km/h.

At a step S2403, a straight line passing through an origin is approximated through a least square method to derive a gradient of the straight line from a point row as shown in FIG. 9. At a step S2404, values of Kbi_LEFT and Kbi_RIGHT are corrected to be in proportion to a magnitude of the gradient of the graph of the standard deviation with respect to the vehicle speed calculated at step S2403. In this embodiment, standard values of Kbi_LEFT and Kbi_RIGHT are predetermined with respect to a predetermined value of the gradient of the standard deviation. Then, the preset standard values of Kbi_LEFT and Kbi_RIGHT are corrected to be in proportion to the magnitude of the gradient of the standard deviation with respect to vehicle speed of the host vehicle.

In this way, the values of Kbi_LEFT and Kbi_RIGHT corrected by learning the deviations of steering angle prediction error (theta)e of the vehicle driver in accordance with vehicle speed V of the host vehicle are modified in accordance with vehicle speed V of the host vehicle, with a dependency of steering angle prediction error (theta)e upon vehicle speed V of the host vehicle taken into consideration, to set the range of partition bi of the steering angle prediction error distributions.

At the subsequent step S2043, controller 100 sets values Tw1, Tw2 of time windows for the calculations of the steering angle prediction error distributions. It should be noted that long time steering angle prediction error 1 is used as the standard criterion (refer to FIG. 5). It should be noted that time window Tw1 for the long time steering angle prediction error 1 is basically set as Tw1=3600 seconds in order to calculate an ordinary distribution representing the ordinarily carried out driving operation of the vehicle driver. It should also be noted that, in order to cope with the case where the vehicle driver is changed in a midway through the storage of data on steering angle prediction error (theta)e, one of 3600 seconds or an elapsed time from a time point at which the data storage is reset which is shorter than the other is set as time window Tw1 with the elapsed time from the time point at which the data storage is reset taken into consideration.

On the other hand, time window Tw2 for present steering angle prediction error distribution 2 is basically set as Tw2=180 seconds, in order to calculate the distribution at the time point immediately before the present time point representing the present driving operation of the vehicle driver. It should be noted that, in order to improve a response characteristic of steering angle prediction error (theta)e immediately after the start of measurement of steering angle prediction error (theta)e, the elapsed time from the time point at which the measurement is started is directly set as time window Tw2 under a situation under which it does not reach to 180 seconds from the time point at which the measurement of steering angle prediction error (theta)e is made for the present run of the host vehicle. Thus, the response characteristic of the calculation of the present steering angle prediction error distribution 2 is improved and a determination of the driving operation by the vehicle driver becomes possible in a short time from the time point at which the measurement thereof is started.

At a step S2050, controller 100 calculates long time steering angle prediction error distribution 1 which is the standard criterion of the steering angle prediction error distribution through the recursive calculation.

Specifically, steering angle prediction error (theta)e calculated at step S2031 is classified into nine partitions b1 through b9 calculated at step S2042 to derive probability pi (p1 through p9) of the frequency of steering angle prediction error (theta)e included in each partition bi with respect to all frequencies in the recursive manner. A method of a determination of one of partitions in which steering angle prediction error (theta)e is distributed and a method of the calculation of probability pi of each partition bi will be described using a flowchart of FIG. 11.

First of all, at a step S2501, controller 100 sets 1 to i representing one of the partitions of the steering angle prediction error. At a step S2502, controller 100 determines whether i is larger than 9. If i>9 (Yes), controller 100 determines that the calculations of respective probabilities pi in the nine partitions have been ended and the present routine is ended. If i is equal to or smaller than 9 (No), the routine goes to a step S2503 in order to calculate probability pi in each partition bi.

At step S2503, controller 100 determines whether steering angle prediction error (theta)e calculated at step S2031 corresponds to target partition bi. If controller 100 determines that steering angle prediction error (theta)e corresponds to partition bi, the routine goes to a step S2504. At step S2504, controller 100 calculates probability pi(n) of steering angle prediction error (theta)e included in partition pi from the following equation (9). In equation (9), N denotes the number of data within time window Tw1.

$$pi(n)=[pi(n-1)+1/N]/(1+1/N) \qquad \text{(Equation (9))}$$

On the other hand, if controller 100 determines that steering angle prediction error (theta)e does not correspond to partition bi, the routine goes to a step S2505. Probability pi(n) of steering angle prediction error (theta)e included in partition bi to which prediction error (theta)e does not correspond is calculated at step S2505 from the following equation (10).

$$pi(n)=[pi(n-1)]/(1+1/N) \qquad \text{(Equation (10))}$$

At a step S2506, controller 100 sets (i+1) as i. Thereafter, the routine returns to step S2502 and the processes of steps S2503 through S2506 are repeated until probabilities pi for all nine partitions are calculated.

In this way, after the recursive calculation of probability pi of steering angle prediction error (theta)e included in each partition pi is carried out at step S2050, the routine goes to a step S2051. At step S2051, controller 100 calculates present steering angle prediction error distribution 2 through the recursive calculation. At step S2051, controller 100 sets time window Tw2 to a value set at step S2043 (for example, one of 180 seconds and the elapsed time from the time point at which the measurement of steering angle prediction error (theta)e is started which is shorter than the other thereof) and calculates present steering angle prediction error distribution 2 at the time point immediately before the present time point using the data of steering angle prediction error (theta)e within time window Tw2.

Specifically, controller 100 calculates probabilities qi (q1 through q9) of the frequency of steering angle prediction error (theta)e included in each partition bi with respect to all frequencies in the recursive manner. The method of calculating probabilities qi in the recursive manner is the same as described above in the calculation method of long time steering angle prediction error distribution 1.

At a step S2070, controller 100 calculates relative entropy RHp using long time steering angle prediction error distribution 1 and present steering angle prediction error distribution 2 from equation (7) described above.

At a step S2071, controller 100 calculates respective absolute entropy HP1, HP2 using long time steering angle prediction error distribution 1 and present steering angle prediction error distribution 2. Absolute entropy HP1 of long time steering angle prediction error distribution 1 is calculated from the following equation (11) using probability pi calculated at step S2050.

[Math. 7]

$$Hp_1 = -\Sigma P_i \cdot \log_9 p_i \qquad \text{(Equation (11))}$$

Absolute value HP2 of present steering angle prediction error distribution 2 is calculated from the following equation (12) using probability qi calculated at step S2051.

[Math. 8]

$$Hp_2 = -\Sigma q_i \cdot \log_9 q_i \qquad \text{(Equation (12))}$$

Each of absolute entropy values Hp1, Hp2 represents a sharpness of the distribution of steering angle prediction error (theta)e. As absolute entropy Hp1, Hp2 becomes smaller, the sharpness of the distribution of steering error prediction error (theta)e becomes larger. However, the distribution of steering angle prediction error (theta)e falls within a constant range. That is to say, the large sharpness thereof indicates that the steering operation was smoothly carried out and the driving is in the stable state. On the contrary, as absolute entropy Hp1, Hp2 becomes larger, the sharpness of the distribution of steering angle prediction error (theta)e becomes smaller. The distribution of steering angle prediction error (theta)e is deviated. That is to say, the small sharpness thereof indicates that the steering operation was carried out un-smoothly (roughly) and the driving is in the unstable state.

At a step S2080, controller 100 compares a value of relative entropy RHp calculated at step S2070 with a first predetermined value therefore. It should be noted that this first predetermined value is a threshold value to determine whether it is necessary to call attention to the vehicle driver since the present driving operation of the vehicle driver is unstable state and is set to an appropriate value. If relative entropy RHp is larger than the first predetermined value, the routine goes to a step S2081. If not larger than the first predetermined value, the present routine is ended.

At step S2081, controller 100 compares a difference between absolute entropy values of Hp1 and Hp2 (Hp2 minus Hp1) calculated at step S2071 with a second predetermined value. It should be noted that the second predetermined value is a threshold value to determine whether absolute entropy Hp2 of present steering angle prediction error distribution 2 is larger than absolute entropy Hp1 of long time steering angle prediction error distribution 1 (Hp2>Hp1), namely, to determine whether the present steering operation becomes more unstable than the ordinarily carried out driving and can basically be set to zero. However, to make stable a result of the determination, the second predetermined value is set to a small positive value (for example, 0.05).

If difference (Hp2 minus Hp1) is larger than the second predetermined value, the routine goes to a step S2090.

If the difference is equal to or smaller than the second predetermined value, the present routine is ended. At step S2090, controller 100 is operated to output the control signal to alarm device 150 (to issue the alarming to call attention to the vehicle driver). That is to say, controller 100 sends the control signal to alarm device 150 informing the vehicle driver through the alarm sound or the display that the driving operation is in the unstable state and the present process is ended.

As described above, in the second embodiment of vehicular driving support apparatus, the following actions and advantages can be obtained in addition to the actions and advantages achieved in the first embodiment.

(1) Vehicular driving support apparatus 1 furthermore calculates respective degrees of randomness of the plurality of running state distributions and determines the unstable driving state on the basis of the magnitude relationship of the plurality of running state distributions. Thus, the unstable running state can be detected with the higher accuracy.

(2) The quantity of memory (area) can be reduced and a continuous calculation becomes possible by calculating the running state distribution corresponding to the predetermined time range in the recursive manner. In addition, the quantity of memory (area) becomes constant irrespective of the magnitude of the time range and the time range to be subject to be measured can arbitrarily (freely) be set.

(3) The running scene of the host vehicle is estimated and the time range is corrected in accordance with the estimated running scene. For example, a case where the determination is reset due to the change of the vehicle driver and the running scene appropriate for the calculation of the running state distribution does not fall within the predetermined time range, the time range is made coincident with the elapsed time from the time point at which the reset of data storage is carried out. Thus, the response characteristic of the running state distribution calculation can be improved and it becomes possible to determine the unstable driving state in the short time from the time at which the start of the measurement of the running state data is carried out.

(4) Controller 100 calculates the running state distribution by partitioning the running state data into the predetermined number of partitions and corrects the widths of the respective partitions in accordance with the detected running state data. Thus, the unstable driving state can be detected with the higher accuracy.

(5) The vehicle speed is used as the running state data to correct the widths of the respective partitions. The deviations of steering angle prediction error (theta)e have the tendency to become larger as vehicle speed V of the host vehicle becomes larger. Hence, by correcting the widths for the respective partitions using vehicle speed V of the host vehicle, the influence of vehicle speed V of the host vehicle on the deviations described above can be corrected. In addition, it is possible to correct the data of steering angle prediction error (theta)e in accordance with vehicle speed V of the host vehicle.

(6) Controller 100 learns the correction quantity of the width of each partition and corrects the width for each of the partitions in accordance with the correction quantity leaned. Thus, the widths for the respective partitions can be corrected in accordance with the characteristics of the respective driver individuals.

Third Embodiment

Hereinafter, vehicular driving support apparatus in a third preferred embodiment according to the present invention will be described below. FIG. 12 shows a system configuration representing a structure of vehicular driving support apparatus 3 in the third embodiment. In the third embodiment, the same reference numeral designate like corresponding elements in each of the first and second embodiments. The detailed explanation thereof will herein be omitted. The difference points in the third embodiment from the second embodiment will chiefly be described below.

Vehicular driving support apparatus 3 in the third embodiment according to the present invention detects the running state of the host vehicle to detect the unstable state of the vehicle driver in place of the driving operation manipulated variable of the vehicle driver.

Then, as shown in FIG. 12, a yaw rate sensor 10 is disposed on the host vehicle in place of steering angle sensor 5. Yaw rate sensor 10 detects a yaw rate of the vehicle and outputs a yaw rate indicative signal to controller 110. Controller 110 uses the yaw rate developed on the host vehicle in place of steering angle prediction error (theta)e to calculate absolute entropy HP1, Hp2 and relative entropy RHp to detect the unstable state of the driving operation. If controller 110 determines that the driving operation is unstable state, the alarm is outputted to call attention to the vehicle driver.

Hereinafter, an operation of vehicular driving support apparatus 3 in the third embodiment will be described with reference to FIG. 13. FIG. 13 shows a flowchart representing the procedure of the driving support control executed in controller 110 in the third embodiment. The content of the procedure is executed continuously at the constant interval of time, for example, whenever 50 milliseconds have passed.

At a step S3010, controller 110 executes the estimation (detection) of the running scene on which the host vehicle is running to determine whether the present running scene (this) is the running scene on which relative entropy RHp (absolute entropy Hp1, Hp2 inclusive) can be calculated. Herein, if vehicle speed V of the host vehicle falls within the predetermined range of vehicle speed V (for example, 40 Km/h through 120 Km/h), the present running scene is the running scene on which the calculation of each of relative entropy and absolute entropy values can be calculated. That is to say, in order to execute an effective calculation of entropy using the yaw rate, cases where vehicle speed V is extremely slow and where vehicle speed V is extremely fast are excluded from the calculation enabling running scene on which the series of the entropy values (RHp, Hp1, Hp2) can be calculated.

At a step S3020, controller 110 determines whether vehicle speed V detected by vehicle speed sensor 30 falls within the predetermined vehicle speed range. If vehicle speed V of the host vehicle falls within the predetermined range and determines that the present running scene is the running scene on which relative entropy RHp and absolute entropy values Hp1, Hp2 can be calculated, the routine goes to a step S3030. On the other hand, in a case where vehicle speed V does not fall within the predetermined vehicle speed range, the present routine is ended.

At step S3030, controller 110 reads yaw rate (phi) detected by yaw rate sensor 10 as the running state of the host vehicle which is an object to be detected to detect the unstable state of the driving operation by the vehicle driver. At a step S3031, controller 110 calculates a particular yaw rate component (phi)s from the read yaw rate value (phi).

In a case where the vehicle is running along the road and the host vehicle is cornered according to a curvature of the road, a steady state yaw rate is developed even if the host vehicle is not unsteady (fluctuating). In order to cope with various road profiles, a value of a steady state component of the yaw rate developed when the host vehicle is running along the road subtracted from the value of yaw rate (phi) detected by yaw rate sensor 10 is calculated as yaw rate particular component (phi)s representing the fluctuation of the host vehicle.

Specifically, controller 110 detects the profile of the road on which the host vehicle is running from navigation system 50 and calculates road curvature (rho) (an inverse number of a radius of curvature (turn) R). In a case where the host vehicle is running on a road having curvature(rho) at vehicle speed V of the host vehicle, a steady-state component of the yaw rate which is developed when the host vehicle turns is represented by (rho)×V(=V/R). Yaw rate particular component (phi)s is a value of subtraction of the steady-state component from yaw rate (phi) developed actually on the host vehicle and detected by yaw rate sensor 10. That is to say, (phi)s is the value of yaw rate corresponding to the fluctuation of a vehicle body of the host vehicle during the run of the vehicle other than that developed during the run along the road and can be expressed from the following equation (13).

$$(phi)s = (phi) - (rho) \times V \qquad \text{(Equation (13))}$$

The processes after a step S3041 are basically the same as those described in the second embodiment. That is to say, at a step S3401, controller 110 reads present vehicle speed V of the host vehicle detected by vehicle speed sensor 30. At a step S3042, controller 110 sets the position and magnitude of the width of each partition bi of yaw rate distributions. At a step S3043, controller 110 sets values of time windows Tw1, Tw2 for the yaw rate distribution calculations. Time window Tw1 in this case is set to, for example, 3600 seconds and time window Tw2 in this case is set to, for example, 180 seconds.

At a step S3050, controller 110 calculates long time yaw rate distribution 1 (for the long time) in the recursive manner which is the standard criterion of the yaw rate distributions. At a step S3051, controller 110 calculates present yaw rate distribution 2 through the recursive calculation. At a step S3051, controller 110 performs the recursive calculation for the present yaw rate distribution 2. At a step S3070, controller 110 calculates relative entropy RHp from above-described equation (7) using long-time yaw rate distribution 1 and present yaw rate distribution 2 and calculates absolute entropy values Hp1, Hp2 from above-described equations (11) and (12) using long time yaw rate distribution 1 and present yaw rate distribution 2.

At a step S3080, controller 110 compares the value of relative entropy RHp calculated at step S3070 with the first predetermined value. If the value of relative entropy RHp is larger than first predetermined value, the routine goes to a step S3081. If the value of relative entropy RHp is equal to or smaller than the first predetermined value, the present routine is ended. At step S3081, controller 110 compares difference between absolute entropy values Hp1 and Hp2 calculated at step S3071 with the second predetermined value. If controller 110 determines that difference of (Hp2 minus Hp1) is larger than the second predetermined value, the routine goes to a step S3071. If controller 110 determines that the difference described above is equal to or smaller than the second predetermined value, the present routine is ended. At step S3090, controller 110 outputs the alarming to call attention to the vehicle driver and the present processing (routine) is ended.

In this way, in the third embodiment according to the present invention, the following actions and advantages can be achieved in addition to those achieved in the each of the first and second embodiments.

That is to say, the unstable state on the driving in the lateral direction can be determined by detecting yaw rate (phi) developed on the host vehicle.

Fourth Embodiment

Vehicular driving support apparatus in a fourth preferred embodiment according to the present invention will be described hereinbelow. A basic structure of vehicular driving support apparatus is the same as the structure described in the first embodiment. Main difference points from the second embodiment will be described later.

Vehicular driving support apparatus 1 in the fourth embodiment detects the running state of the vehicle to detect the unstable state of the vehicle driver in place of the driving operation manipulated variable of the vehicle driver. Hence, steering angle sensor 5 can be omitted. Controller 100 in the fourth embodiment calculates relative entropy RHp and absolute entropy values Hp1, Hp2 using a lateral position of the host vehicle within a traffic lane of the vehicle on the road on which the vehicle is running in place of steering angle prediction error (theta)e to detect the unstable state of the vehicle driver.

Hereinafter, the operation of vehicular driving support apparatus 1 in the fourth embodiment will be explained with reference to FIG. 14. FIG. 14 is a flowchart of the procedure of the driving support control executed in controller 100 in the fourth embodiment. The processing shown in FIG. 14 is continuously executed for each of constant time intervals, for example, whenever 50 milliseconds have passed.

At a step S4010, controller 110 executes the estimation (detection) of the running scene on which the host vehicle is running in order to determine whether the present running scene is the running scene on which relative entropy RHp can be calculated.

At a step S4020, controller 110 determines whether present vehicle speed V of the host vehicle detected by vehicle speed sensor 30 falls within the predetermined range or determines whether a pair of white lines is accurately detected by means of forwardly oriented camera 15. If controller 100 determines that vehicle speed V of the host vehicle falls within the predetermined vehicle speed range and determines that the pair of white lines is clearly detected, controller 100 determines that the present running scene is the running scene on which relative entropy RHp and absolute entropy values Hp1, Hp2 can be calculated. Then, the routine goes to a step S4030. On the other hand, if the answer of step S4020 is negative (No), the present routine is ended.

At step S4030, controller 100 reads a lateral position (delta) within the traffic lane of the host vehicle detected by forwardly oriented camera 15. For example, controller 100 detects the pair of white lines of the road on which the host vehicle is running with an image processing for a photographed image of forwardly oriented camera 15 carried out to detect a lateral distance from a center of traffic lane to a center of the host vehicle as a lateral position (delta) within the traffic lane. This lateral position (delta) within the traffic lane indicates 0 when the host vehicle is on the center of the traffic lane and indicates a maximum value when the host vehicle is on one of the pair of white lines.

At a step S4041, controller 100 reads vehicle speed V of the host vehicle detected by vehicle speed sensor 30. At a step S4042, controller 100 sets position and magnitude of the width of each partition bi of the lateral position distribution within the traffic lane in accordance with vehicle speed V of the host vehicle read at step S4041 and the road profile obtained from navigation system 50. Specifically, controller 100 sets the position and magnitude of the width of each partition bi (b1 through b9) as shown in FIG. 15. As vehicle speed V becomes larger (higher), any one or more of the partitions which is nearer to each of the pair of white lines is widened relatively with respect to the any other of partitions which is nearer to the center of the traffic lane. In addition, one of the partitions which is inner to a curved road is widened relatively which is outer to the curved road. It should be noted that a region for lateral position (delta) within the traffic lane to exceed a left-side white line is position b1 and a region for lateral position (delta) within the traffic lane to exceed a right-side white line is partition b9.

At a step S4043, controller 100 sets values of time windows Tw1, Tw2 for lateral position within the traffic lane distribution calculation. Time window Tw1 is set to, for example, 3600 seconds and time window Tw2 is set to, for example, 180 seconds.

At a step S4050, controller 100 calculates long time lateral position within the traffic lane distribution 1 which is the standard criterion of the lateral position within the traffic lane distributions through the recursive calculation. At a step S4051, controller 100 calculates present lateral position within the traffic lane distribution 2 through the recursive calculation. At a step S4060, controller 100 sets a weight Wi for each partition bi. Weights W1 through W9 for partitions b1 through b9 are set, for example, as follows: W1=1.0, W2=0.75, W3=0.5, W4=0.25, W5=0.0, W6=0.25, W6=0.25, W7=0.50, W8=0.75, W9=1.0.

At step S4070, controller 100 determines relative entropy RHp from the following equation (14) using long time lateral position within the traffic lane distribution 1, present lateral position within the traffic lane distribution 2, and weight Wi for each partition bi.

[Math. 9]

$$RHp = \sum W_i q_i \cdot \log_9 \frac{q_i}{p_i} \quad \text{(Equation (14))}$$

At a step S4071, controller 100 calculates absolute entropy values Hp1, Hp2 from the following equations (15) and (16).

[Math. 10]

$$Hp_1 = -\Sigma W_i P_i \cdot \log_9 p_i \quad \text{(Equation (15))}$$

[Math. 11]

$$Hp_2 = -\Sigma W_i q_i \cdot \log_9 q_i \quad \text{(Equation (16))}$$

At a step S4080, controller 100 compares the value of relative entropy RHp calculated at step S4070 with the first predetermined value. If the value of relative entropy RHp is larger than the first predetermined value, the routine goes to a step S4081. If the value of relative entropy RHp is equal to or smaller than the first predetermined value, the present routine is ended. At step S4081, controller 100 compares difference (Hp2 minus Hp1) with the second predetermined value. If difference (Hp2 minus Hp1) is larger than the second predetermined value, the routine goes to a step S4090. If the difference is equal to or smaller than the second predetermined value, the present routine is ended. At step S4090, controller 100 outputs the alarming to call attention to the vehicle driver. Then, the present routine is ended.

In this way, in the fourth embodiment according to the present invention, in addition to the actions and advantages in each of the first, second, and third embodiments, the following action and advantages can be achieved. (1) The running state data are classified (partitioned) into the predetermined number of partitions to calculate the running state distributions and the weights are given to respective partitions bi to calculate the difference quantity between the plurality of running state distributions. Thus, the unstable driving state during the run of the vehicle can be determined with the higher accuracy. For example, (2) the unstable state on the drive of the vehicle driver in the lateral direction to the driver's longitudinal driving can be determined. In the case where the data on the lateral position within the traffic lane is used, the weights of any one or more of the partitions which are nearer to each of the white lines are made large. Thus, the determination of the unstable state of the vehicle driver can be made with the higher accuracy. In addition, as the vehicle speed of the host vehicle becomes larger (higher), the partitions are appropriately widened in such a way that any one or more of the partitions which are nearer to each of the pair of white lines is relatively widened and any one or more of the partitions which are more inner to the curved road are relatively widened. Thus, the running state data obtained under the various running situations can be used without an excessive restriction of the running scene on which the running state distribution can be calculated.

Fifth Embodiment

Hereinafter, vehicular driving support apparatus 5 in a fifth preferred embodiment according to the present invention will be described below. FIG. 16 shows a system configuration view representing a structure of vehicular driving support apparatus 5. In FIG. 16, the same reference numerals as described in each of the first, second, third, and fourth embodiments designate like corresponding elements and the detailed explanations thereof are omitted herein. The difference points in the fifth embodiment from the second embodiment described above will chiefly be described.

Vehicular driving support apparatus 5 in the fifth embodiment detects the driving operation of the vehicle driver on an accelerator pedal or the driving operation of the vehicle driver on a brake pedal in place of steering angle prediction error (theta)e to detect the unstable state of the vehicle driver. Therefore, as shown in FIG. 16, vehicular driving support apparatus 5 in the fifth embodiment according to the present invention is equipped with accelerator pedal stroke sensor 11 and a brake pedal stroke sensor 12 in place of steering angle sensor 13. Accelerator pedal stroke sensor 11 detects a manipulated variable (depression stroke quantity) of the accelerator pedal when the vehicle driver operates to depress an accelerator pedal and outputs a signal indicating the manipulated variable (depression depth or depression stroke) of the accelerator pedal to controller 120. Brake pedal stroke sensor 12 detects the manipulated variable of the brake pedal when the vehicle driver is operated to depress the brake pedal and outputs the manipulated variable of the brake pedal (brake pedal depression depth or pedal stroke) to controller 120. Furthermore, vehicular driving support apparatus 5 includes a road gradient sensor 13 to detect a road gradient of the road on which the vehicle is running.

Controller 120 calculates relative entropy RHp and absolute entropy values Hp1, Hp2 using the accelerator pedal manipulated variable and brake pedal manipulated variable in place of steering angle prediction error (theta)e to detect the unstable state of the driving operation of the vehicle driver. If the unstable state of the driving operation is determined (detected), the alarming is outputted to call attention to the vehicle driver.

Hereinafter, an operation of vehicular driving support apparatus in the fifth preferred embodiment according to the present invention will be described with reference to FIG. 17. FIG. 17 shows a flowchart of a driving support control procedure executed in controller 120 in the fifth embodiment. The processing content shown in FIG. 17 is continuously executed at the constant interval of time, for example, for each of 50 milliseconds (whenever 50 milliseconds have passed).

At a step S5010, controller 120 carries out the estimation (detection) of the running scene on which the host vehicle is running to determine whether the present running scene is the running scene on which relative entropy RHp and absolute entropy values Hp1, Hp2 can be calculated. In the case where vehicle speed V of the host vehicle is within the predetermined range (for example, 40 km/h to 120 km/h), the present running scene is the running scene on which relative entropy RHp and absolute entropy values Hp1, Hp2 can be calculated.

At a step S5020, controller 120 determines whether present vehicle speed V detected by vehicle speed sensor 30 falls within the predetermined vehicle speed range. If vehicle speed V of the host vehicle detected by vehicle speed sensor 30 falls within the predetermined range (for example, 40 km/h through 120 Km/h), controller 120 determines that the present running scene is the running scene on which relative entropy value RHp and absolute entropy values Hp1, Hp2 can be calculated. Thus, the present routine goes to a step S5030. On the other hand, if vehicle speed V of the host vehicle does not fall within the predetermined range, the present processing is ended.

At a step S5030, controller 120 reads the running state of the host vehicle which provides the object to be detected to detect the unstable state of the driving operation of the vehicle driver, viz., accelerator pedal manipulated variable SA detected by accelerator pedal stroke sensor 11 and brake pedal manipulated variable SB detected by brake pedal stroke sensor 12. The outputs of accelerator pedal stroke sensor 11 and brake pedal stroke sensor 12 are indicated within a range from 0.0 to 1.0 with a released state of each pedal set to 0.0 and a maximum depressed state (a maximum stroke) set to 1.0 (100%).

At a step S5031, controller 120 calculates an acceleration/deceleration controlled variable (alpha) expressed in the following equation (17) by adding read accelerator pedal manipulated variable SA and sign-inverted brake pedal manipulated variable SB.

$$(alpha) = SA + (-1) \times SB \qquad \text{(Equation (17))}$$

Acceleration/deceleration controlled variable (alpha) indicates a positive value (0.0 through 1.0) during the acceleration at which the accelerator pedal is depressed and indicates a negative value during the deceleration at which the brake pedal is depressed.

At a step S5032, controller 120 reads the gradient of road on which the host vehicle is running to correct acceleration/deceleration controlled variable (alpha) according to the gradient of the road. In a case where the host vehicle is running on an ascending slope, it is necessary to depress the accelerator pedal to maintain the vehicle speed of the host vehicle at the constant speed. Hence, acceleration/deceleration controlled variable (alpha) indicates a large value as compared with a case where the vehicle is running on a flat road at the constant speed. Hence, as the road gradient becomes larger, a correction value becomes larger. This correction value is calculated by controller 120. Controller 120 performs the correction of acceleration/deceleration controlled variable (alpha) by subtracting the correction value from acceleration/deceleration controlled variable (alpha).

In addition, in a case where the vehicle is running on a descending slope, it is necessary to depress the brake pedal even to maintain the vehicle speed constant. Thus, acceleration/deceleration controlled variable (alpha) indicates a minus (negative) value (small value) as compared with the case where the host vehicle is running on the flat road at the constant speed. Hence, the correction value such that, as the road gradient of the descending slope becomes larger, the correction value becomes larger is calculated. The correction of acceleration/deceleration controlled variable (alpha) carried out by adding the correction value to acceleration/deceleration controlled variable (alpha). A relationship of the correction value to the road gradient is such a characteristic that the correction value becomes larger as the road gradient of the ascending slope and that of the descending slope become respectively larger.

At a step S5043, controller 120 sets values of time windows Tw1, Tw2 for the distribution calculation of acceleration/deceleration variable (alpha) based on the accelerator pedal depression and brake pedal depression operations. Time window Tw1 is set to, for example, 3600 seconds and time window Tw2 is set to, for example, 180 seconds.

At a step S5050, controller 120 calculates long time acceleration/deceleration controlled variable (alpha) distribution 1 which is the standard criterion of the distribution of acceleration/deceleration controlled variable (alpha) through the recursive calculation. At a step S5051, controller 120 calculates present distribution of acceleration/deceleration controlled variable (alpha) through the recursive calculation. It should be noted that each of long time and present distributions 1, 2 of controlled variable (alpha) is calculated using acceleration/deceleration controlled variable (alpha) corrected on the basis of the road gradient at step S5032. At a step S5070, controller 120 derives relative entropy RHp from equation (7) using long time acceleration/deceleration controlled variable (alpha) distribution 1 and present acceleration/deceleration controlled variable (alpha) distribution 2. At a step S5071, controller 120 calculates respective absolute entropy values of Hp1, Hp2 from equations (11) and (12) using long time acceleration/deceleration controlled variable (alpha) distribution 1 and present distribution 2 of acceleration/deceleration controlled variable (alpha).

At a step S5080, controller 120 compares value of relative entropy RHp calculated at step S5070 with the first predetermined value. If the value of relative entropy RHp is larger than the first predetermined value, the routine goes to a step S5081. If the value of relative entropy RHp is equal to or smaller than the first predetermined value, the present routine is ended. At step S5081, controller 120 compares difference of the values of absolute entropy HP1, Hp2 (Hp2 minus Hp1) calculated at step S5071 with the second predetermined value. If difference of (Hp2 minus Hp1) is larger than the second predetermined value, the routine goes to a step S5090. If difference of (Hp2 minus Hp1) is determined to be equal to or smaller than the second predetermined value, the present routine is ended. At step S5090, the alarming is outputted to call attention to the vehicle driver. Then, the present routine is ended.

As described above, in the fifth embodiment described above, the following actions and advantages can be achieved in addition to the action and advantages achieved by each of the first, second, third, and fourth embodiments according to the present invention.

That is to say, the unstable state of the vehicle driver on the driving of the host vehicle in the vehicular longitudinal direction (namely, forward-and-backward direction) can be detected by detecting accelerator pedal manipulated variable SA and manipulated variable SB of the brake pedal as the running state data.

Sixth Embodiment

Hereinafter, vehicular driving support apparatus 6 in a sixth preferred embodiment according to the present invention will be described below. FIG. 18 shows a system configuration view representing a structure of vehicular driving support apparatus 6 in the sixth embodiment. In FIG. 18, the same reference signs and numerals as those of each of the first through fifth embodiments designate corresponding elements in each of the first through fifth embodiments. The detailed explanations thereof will herein be omitted. Main difference points in the sixth embodiment from the second embodiment described above will chiefly be described below.

Vehicular driving support apparatus 6 in the sixth embodiment detects the unstable state of the vehicle driver by detecting an inter-vehicle time Th from the host vehicle to a preceding vehicle running in front of the host vehicle in place of steering angle prediction error (theta)e. Then, as shown in FIG. 18, a laser radar 14 is installed in place of steering angle sensor 5. Laser radar 14 is mounted on a vehicular front grill portion or vehicular bumper to irradiate an infrared ray pulse in a horizontal direction to scan the vehicular forward detection zone. Laser radar 14 measures reflected waves of infrared light pulses reflected by a plurality of reflective matters located in front of the vehicle (ordinarily the rear end of the forward vehicle) and detects inter-vehicle distances to a plurality of forwardly running vehicles and present directions thereof according to arrival times of the reflected waves. The detected inter-vehicle distances and present directions are outputted to controller 50. The forward detection zone scanned by laser radar 10 is approximately (plus-or-minus) 6 degrees with respect to a vertical direction from a center of a front surface portion of the vehicle body of the host vehicle and forward objects present within this scanning range are detected. Laser radar 14 outputs an inter-vehicle distance D from the host vehicle to, for example, the preceding vehicle to controller 130.

Controller 130 calculates inter-vehicle time Th between the host vehicle and the preceding vehicle and calculates relative entropy RHp and absolute entropy HP1, Hp2 to detect the unstable state of the driving operation. Then, when controller 130 determines that the driving operation is unstable, controller 130 outputs the alarming to call attention to the vehicle driver.

Hereinafter, an operation of vehicular driving support apparatus 6 in the sixth embodiment will be described with reference to the flowchart of FIG. 19. FIG. 19 shows the flowchart of the procedure of the driving support control executed in controller 130 in the sixth embodiment. The content of procedure is continuously executed at the constant interval of time, for example, whenever 50 milliseconds have passed.

At a step S6010, controller 130 performs the estimation (detection) of the running scene on which the host vehicle is running to determine whether the present running scene is the running scene on which relative entropy RHp (and absolute entropy values Hp1, Hp2) can be calculated. In this embodiment, in a running scene on which vehicle speed V of the host vehicle falls within the predetermined range (for example, 40 Km/h through 120 Km/h) and the host vehicle is stably following up a forwardly running vehicle (viz., the preceding vehicle), controller 130 determines that the present running scene is the running scene on which the values of relative entropy RHp and absolute entropy Hp1, Hp2 can be calculated. It should herein be noted that a state in which inter-vehicle time Th between the host vehicle and the preceding vehicle falls in a pre-determined range of 0 to 3 seconds is assumed to be the stable following up state.

At step S6020, controller 130 determines whether present vehicle speed V detected by vehicle speed sensor 30 falls within the predetermined range, or determines whether inter-vehicle time Th falls within a predetermined time range. If controller 130 determines that present vehicle speed V of the host vehicle falls in the predetermined range and the host vehicle is stably following up the preceding vehicle, controller 130 determines that relative entropy values and absolute entropy values RHp, Hp1, Hp2 can be calculated and the routine goes to a step S6030. On the other hand, if the negative determination is made (No) at step S6020, the present routine is ended. It should be noted that inter-vehicle time Th to determine the stable following up state can be calculated using equation (18) which will be described later.

At a step S6030, controller 130 obtains inter-vehicle time Th between the host vehicle and the preceding vehicle as the running state of the host vehicle which is the object to detect the unstable state of the driving operation of the vehicle driver. It should be noted that inter-vehicle time Th (ThW) is a physical quantity representing a time duration for the host vehicle to reach to the present position of the preceding vehicle and is calculated from the following equation (18).

$$ThW = D/V \quad \text{(Equation (18))}$$

At a step S6043, controller 130 sets time windows Tw1, Tw2 for the distribution calculation of inter-vehicle time Th. Time window Tw1 is, for example, set to one of 3600 seconds and the elapsed time from the time point at which the calculation is reset which is shorter than the other and time window Tw2 is set, for example, to one of 180 seconds and the elapsed time from the time point at which the measurement (of inter-vehicle time Th) is started which is shorter than the other.

At a step S6050, controller 130 calculates a long time inter-vehicle time distribution 1 which is the standard criterion of the inter-vehicle time distribution through the recursive calculation using data of inter-vehicle time Th within time window Tw1. In this case, for example, inter-vehicle time Th is partitioned into fifteen partitions bi (b1 through b15) for 0.2 second interval of time from 0 to 3 seconds. Controller 130 calculates probabilities pi (i=1 through 15) of the frequency of inter-vehicle time Th included in each of partitions bi with respect to all frequencies through the recursive calculation.

At a step S6051, controller 130 calculates present inter-vehicle time distribution 2 using data of inter-vehicle time Th within time window Tw2 through the recursive calculation. In the same way as long time inter-vehicle time Th distribution 1, for example, inter-vehicle time Th is partitioned into fifteen partitions bi (p1 through p15) for each of 0.2 seconds from 0 to 3 seconds and probability pi (p1 through p15) of the frequency of inter-vehicle time Th included in each partition bi is calculated in the recursive manner.

At step S6060, controller 130 calculates a cumulative frequency distribution CDF using the following equation (19) from the long time inter-vehicle time distribution 1.

[Math. 12]

$$CDF_i = \sum_{k=1}^{i} p_k \quad \text{(Equation (19))}$$

At a step S6061, controller 130 sets a weight Wi for each of partitions pi. Specifically, an importance is placed on a region in which the inter-vehicle time Th is small (short) and a degree of approach of the host vehicle to the preceding vehicle is high (near) to enlarge the corresponding weight and the weight on another region in which inter-vehicle time Th is large (long) is made small (light). Suppose that, for example, weight Wi of the partition of a region in which present inter-vehicle time Th is equal to or shorter (smaller) than a predetermined value (for example, one second) is set to 1, weight Wi of the partition in an intermediate region (for example, 1 second through 2 seconds) is set to 0.5, and weight Wi of the partition of a region (for example, exceeding 2 seconds) in which inter-vehicle time Th is relatively large (long) is set to 0.25. Thus, the degree of importance can be modified for each region of inter-vehicle distance Th.

At a step S6070, relative entropy RHp is calculated from the following equation (20) using long-time inter-vehicle distance distribution 1, present inter-vehicle time distribution 2, and weight Wi of each partition bi.

[Math. 13]

$$RHp = \sum W_i q_i \cdot \log_{15} \frac{q_i}{CDF_i} \quad \text{(Equation (20))}$$

Relative entropy RHp calculated from equation (20) represents a relative entropy between cumulative frequency distribution CDFi calculated from long time inter-vehicle time distribution 1 and present inter-vehicle time distribution 2. Cumulative frequency distribution CDFi represents a rate of the vehicle driver driving the host vehicle in inter-vehicle time Th or shorter (smaller) to the whole vehicle driver driving time. Hence, the use of equation (20) permits the calculation of relative entropy RHp, with the weight to which the ordinarily carried out driving situation of the vehicle driver is given set, in addition to the weight such that the importance is placed on the short inter-vehicle time region.

At a step S6071, controller 130 calculates respective absolute entropy values Hp1, Hp2 from the following equations (21) and (22), respectively, using long time inter-vehicle time distribution 1 and present inter-vehicle time distribution 2.

[Math. 14]

$$Hp_1 = -\Sigma W_i P_i \cdot \log_{15} p_i \quad \text{(Equation (21))}$$

[Math. 15]

$$Hp_2 = -\Sigma W_i q_i \cdot \log_{15} q_i \quad \text{(Equation (22))}$$

At a step S6080, controller 130 compares the value of relative entropy RHp calculated at step S6070 with the first predetermined value. If relative entropy value RHp is larger than predetermined value, the routine goes to a step S6081. If the value of relative entropy RHp is equal to or smaller than the first predetermined value, the present routine is ended. At step S6081, controller 130 compares difference between absolute entropy values Hp1, Hp2 with the second predetermined value. If difference (Hp2 minus Hp1) is larger than the second predetermined value, the routine goes to a step S6090. If the difference is equal to or smaller than the second predetermined value, the present routine is ended. At step S6090, controller 130 outputs the control signal to alarm device 150 to output the alarming to call attention to the vehicle driver. Then, the present processing is ended.

As described above, in the sixth embodiment of vehicular driving support apparatus 6, the following action and advantages can be achieved in addition to the actions and the advantages in the first through fifth embodiments described above.

(1) The running state cumulative frequency distribution is calculated from the calculated running state distribution and the running state cumulative frequency distribution is used as the weight of each of the partitions. Use of cumulative frequency distribution CDFi permits more conformity to the difference in the driving state of the individual vehicle drivers and, in a case where the running state data are concentrated onto only a single partition, an influence of deviations of its concentrated positions becomes difficult to receive. Then, noise-resistant calculations can be carried out.

(2) Since inter-vehicle time Th between the host vehicle and a forwardly present obstacle is obtained, the unstable state on the vehicular forward-and-backward (longitudinal) directional driving of the vehicle driver can be detected. It should be noted that the running state distribution can be calculated using an inter-vehicle distance D between the host vehicle and the forward obstacle in place of inter-vehicle time Th.

Seventh Embodiment

Hereinafter, the vehicular driving support apparatus in a seventh preferred embodiment will be described. The basic structure of the vehicular driving support apparatus in the seventh embodiment is the same as those described in the sixth embodiment shown in FIG. 18. Main difference points of the seventh embodiment from the sixth embodiment will chiefly be described below.

Vehicular driving support apparatus 6 in the seventh embodiment uses vehicle speed V of the host vehicle in place of inter-vehicle time Th to detect the unstable state of the vehicle driver. Controller 130 in the seventh embodiment calculates relative entropy value RHp and each of absolute entropy values Hp1, Hp2 using vehicle speed V of the host vehicle. Then, if controller 130 determines that the driving operation is unstable, the alarming is issued to call attention to the vehicle driver.

Hereinafter, the operation of vehicular driving support apparatus 6 in the seventh embodiment will be described with reference to FIG. 20. FIG. 20 shows a flowchart representing the procedure of the driving support control executed in controller 130 in the seventh embodiment. The content of the processing shown in FIG. 20 is executed at the constant interval of time, for example, the processing shown in FIG. 20 is continuously is executed whenever 50 milliseconds have passed.

At a step S7010, controller 130 performs the estimation (or detection) of the running scene on which the vehicle is running in order to determine whether relative entropy RHp can be calculated. In this case, if vehicle speed V of the host vehicle falls within the predetermined range (for example, 40 Km/h through 120 Km/h) and the obstacle present in front of the vehicle is not detected, controller 130 assumes the present running scene as the running scene on which relative entropy RHp and absolute entropy values HP1, Hp2 can be calculated.

At a step S7020, controller 130 determines whether present vehicle speed V detected by vehicle speed sensor 30 falls within the predetermined range or determines whether laser radar 14 does not detect the forwardly present obstacle. If vehicle speed V of the host vehicle falls within the predetermined speed range and laser radar 14 does not detect the presence of the preceding vehicle (forwardly present obstacle), controller 130 determines that the present running scene is the running scene on which relative entropy value RHp and absolute entropy values Hp1, Hp2 can be calculated and the routine goes to a step S7030. If the result of determination is negative (No) at step S7020, the present processing is ended.

At step S7030, controller 130 reads vehicle speed V of the host vehicle detected by vehicle speed sensor 30 as the running state of the host vehicle which is the object to be detected to detect the unstable state of the driving operation of the vehicle driver. At a step S7031, controller 130 reads a limitation (limit) speed of the same vehicle of a road on which the host vehicle is to presently run from navigation system 50. Controller 130 then sets an appropriate recommended vehicle speed on a basis of the limit speed of the vehicle on a road on which the host vehicle is to presently run.

At step S7043, controller 130 sets time windows Tw1, Tw2 for the calculation of the vehicle speed distributions. It should be noted that time window Tw1 is set, for example, to one of 3600 seconds or the elapsed time from the time point at which the reset of the data storage is executed which is shorter than the other and time window Tw2 is set, for example, to one of 180 seconds and the elapsed time from the time point at which the measurement of this vehicle speed distributions is started is shorter than the other.

At a step S7050, controller 130 calculates a long time vehicle speed distribution 1 which is the standard criterion of the vehicle speed distribution using data of vehicle speed V within time window Tw1 through the recursive calculation. At a step S7051, controller 130, in turn, calculates a present vehicle speed distribution 2 using the date in vehicle speed V within time window Tw2 through the recursive calculation.

At step S7060, controller 130 sets weight Wi for each of partitions bi. Specifically, controller 130 can set a magnitude of weight in accordance with a degree of deviation from the recommended vehicle speed based on the limitation (limit) speed of the host vehicle presently running and set at step S7031. For example, supposing that the recommended vehicle speed is 60 Km/h, weight Wi is set, with a weight Wi at the region in which vehicle speed V of the host vehicle is slower than 60 Km/h zeroed, and, as vehicle speed V of the host vehicle becomes larger at a speed equal to or higher than 60 km/h, weight Wi becomes nearer to 1.

At a step S7061, controller 130 calculates a cumulative frequency distribution CDF using equation (19) described above from long time vehicle speed distribution 1. At a step S7070, controller 130 calculates relative entropy RHp from equation (20) using long time vehicle speed distribution 1, specifically cumulative frequency distribution CDF, present vehicle speed distribution 2, and weight Wi for each of partitions bi.

At a step S6071, controller 130 calculates respectively corresponding absolute entropy values Hp1, Hp2 from equations (21) and (22) using long time inter-vehicle time distribution 1 and present inter-vehicle time distribution 2.

At a step S7080, controller 130 compares the value of relative entropy RHp calculated at step S7070 with the first predetermined value. If the value of relative entropy RHp is larger than the first predetermined value, the routine goes to a step S7081. If the value of relative entropy RHp is equal to or smaller than the first predetermined value, the present routine is ended. At a step S7081, controller 130 compares difference between the values of absolute entropy Hp1, Hp2 with the second predetermined value. If difference (Hp2 minus Hp1) is larger than the second predetermined value, the routine goes to a step S7090. If difference (Hp2 minus Hp1) is equal to or smaller than the second predetermined value, the present routine is ended. At step S7090, controller 130 outputs the control signal to the alarm device to call attention to the vehicle driver. Thereafter, the present processing is ended.

As described above, in the seventh embodiment as described hereinabove, the following action and advantage can be achieved in addition to the actions and advantages described in the first, second, third, fourth, fifth, and sixth embodiments described above. That is to say, since vehicle speed V of the host vehicle is detected as the running state data, the unstable state of the driving operation in the vehicular forward-and-backward direction of the vehicle driver can be detected.

In the third and fourth embodiments described above, yaw rate (phi) and lateral position (delta) within the traffic lane detected as the running state data can be corrected in accordance with vehicle speed V of the host vehicle. In the same way as steering angle prediction error (theta)e described in the second embodiment, the deviations of yaw rate (phi) on the driving of the lateral directional driving and lateral position (delta) within the traffic lane receives the influence of vehicle speed V of the host vehicle. With this influence taken into consideration, the running state data is corrected so as to enable the detection of the unstable state of the driving with the higher accuracy.

In each of the first through seventh embodiments described hereinabove, steering angle sensor 5, yaw rate sensor 10, accelerator pedal stroke sensor 11, brake pedal stroke sensor 12, road gradient sensor 13, laser radar 14, forwardly oriented camera 15, vehicle speed sensor 30, and navigation system 50 can function as a running state detecting section (means). Controller 100, 110, 120, and 130 can function as a running state distribution calculating section (means), a distribution difference quantity calculating section (means), an unstable state detecting section (means), a randomness calculating section (means), a running scene estimating section (means), and an unstable state cumulative frequency distribution calculating section (means). The running state detecting section (means) is not limited to the above-described respective sensors and to the system, the running state data can be detected by another section (means). It should be noted that the above description is concerned with merely examples. When the present invention is interpreted, neither limitation nor restriction is placed on a corresponding relationship between the described matters of the above-described embodiments and the scope of the claims.

Technical concepts of the present invention will be described below.

(a) A vehicular driving support apparatus comprises: a running state detecting section configured to detect a running state of a vehicle; a running state distribution calculating section configured to calculate a plurality of running state distributions on a basis of the running state detected by the running state detecting section; a distribution difference quantity calculating section configured to calculate a difference quantity between the plurality of running state distributions by the running state distribution calculating section; and an unstable driving state detecting section configured to detect an unstable driving state from a magnitude of the difference quantity calculated by the distribution difference quantity calculating section.

(b) In the vehicular driving support apparatus as set forth in item (a), the running state distribution calculating section calculates the plurality of running state distributions different in range of time in a form of the plurality of running state distributions.

(c) In the vehicular driving support apparatus as set forth in item (a), the vehicular driving support apparatus further comprises a randomness calculating section configured to calculate a degree of randomness for each of the plurality of running state distributions and wherein the unstable driving state detecting section detects the unstable driving state on a basis of a magnitude relationship in randomness of each of the plurality of running state distributions calculated at the randomness calculating section in addition to the magnitude of the difference quantity between the plurality of running state distributions.

(d) In the vehicular driving support apparatus as set forth in item (a), the running state distribution calculating section calculates the running state distributions corresponding to a predetermined range of time in a recursive manner.

(e) In the vehicular driving support apparatus as set forth in item (d), the vehicular driving support apparatus further comprises: a running scene estimating section configured to estimate a running scene of the vehicle; and a time range correcting section configured to correct the range of time used in the running state distribution calculating section in accordance with the running scene estimated by the running scene estimating section.

(f) In the vehicular driving support apparatus as set forth in item (a), the running state distribution calculating section partitions data of the running state detected by the running state detecting section into a predetermined number of partitions to calculate the plurality of running state distributions and the distribution difference quantity calculating section calculates the difference quantity between the plurality of running state distributions with a weight given to each of the partitions.

(g) In the vehicular driving support apparatus as set forth in item (f), the vehicular driving support apparatus further comprises: a running state cumulative frequency distribution calculating section configured to calculate a running state cumulative frequency distribution from the running state distributions calculated by the running state distribution calculating section and the distribution difference quantity calculating section uses the running state cumulative frequency distribution calculated by the running state cumulative frequency distribution calculating section in the form of a weight for each of the partitions.

(h) In the vehicular driving support apparatus as set forth in item (a), the running state distribution calculating section calculates the running state distribution partitions data of the running state into a predetermined number of partitions to calculate the plurality of running state distributions and the vehicular driving support apparatus further comprises a partition width correcting section configured to correct a width of each of the partitions in accordance with the data of the running state detected by the running state detecting section.

(i) In the vehicular driving support apparatus as set forth in item (h), the partition width correcting section uses a vehicle speed which is the data of the running state to correct the width for each of the partitions.

(j) In the vehicular driving support apparatus as set forth in item (i), the vehicular driving support apparatus further comprises a partition width correction quantity learning section configured to learn a correction quantity of the width of each of the partitions in the partition width correcting section and wherein the partition width correcting section corrects the width of each of the partitions in accordance with the correction quantity learned by the partition width correction quantity learning section.

(k) In the vehicular driving support apparatus as set forth in item (a), the running state detecting section obtains a steering angle prediction error in a form of data of the running state.

(l) In the vehicular driving support apparatus as set forth in item (a), the running state detecting section detects an accelerator pedal manipulated variable and a brake pedal manipulated variable in a form of data of the running state.

(m) In the vehicular driving support apparatus as set forth in item (a), the running state detecting section detects a yaw rate developed on the vehicle in a form of data of the running state.

(n) In the vehicular driving support apparatus as set forth in item (a), the running state detecting section detects a lateral position within a traffic lane in a form of data of the running state.

(o) In the vehicular driving support apparatus as set forth in item (a), the running state detecting section obtains an inter-vehicle time between the vehicle and a forwardly present obstacle in a form of the detected running state.

(p) In the vehicular driving support apparatus as set forth in item (a), the running state detecting section detects a vehicle speed of the vehicle in a form of data of the running state.

(q) In the vehicular driving support apparatus as set forth in item (k), the vehicular driving support apparatus further comprises a running state data correcting section configured to correct data of the detected running state in accordance with a vehicle speed of the vehicle.

(r) In the vehicular driving support apparatus as set forth in item (a), the distribution difference quantity calculating section calculates a relative entropy in a form of the difference quantity between the plurality of running state distributions.

(s) In the vehicular driving support apparatus as set forth in item (a), data of the running state comprises at least one of a vehicular dynamical motion, on a vehicular surrounding environment, and on a driving manipulated variable for the vehicle of a vehicle driver.

(t) In the vehicular driving support apparatus as set forth in item (r), the distribution difference quantity calculating section calculates a difference of absolute entropy values in a form of the difference quantity between the plurality of running state distribution in addition to the relative entropy.

(u) In the vehicular driving support apparatus as set forth in item (a), the vehicular driving support apparatus further comprises an alarm device configured to issue an alarming to call attention to a vehicle driver when the unstable state detecting section detects the unstable driving state.

It should be noted that the terms with round brackets (alpha), (theta), (phi), (rho), (delta), and (plus-or-minus) used in the whole specification correspond to symbols described in the following:

[Math. 16]

(alpha)→$\alpha$(theta)→$\theta$(phi)→$\phi$ (rho)→$\rho$(delta)→$\delta$(plus-or-minus)→$\pm$ The contents of priority claimed Japanese Patent Application No. 2007-172298 filed in Japan on Jun. 29, 2008 are herein incorporated by reference. Various changes and modifications may be made without departing from the scope and the sprit of the present invention which is defined by the appended claims.

The invention claimed is:

1. A vehicular driving support apparatus, comprising:
a running state detecting section configured to detect a running state of a vehicle;
a running state distribution calculating section configured to calculate a plurality of running state distributions on a basis of the running state detected by the running state detecting section;
a distribution difference quantity calculating section configured to calculate a difference quantity between the plurality of running state distributions calculated by the running state distribution calculating section; and
an unstable driving state detecting section configured to detect an unstable driving state from a magnitude of the difference quantity calculated by the distribution difference quantity calculating section,
wherein the running state distribution calculating section is configured to calculate the plurality of running state distributions such that the plurality of running state distributions are different in range of time.

2. The vehicular driving support apparatus as claimed in claim 1, wherein the vehicular driving support apparatus further comprises a randomness calculating section configured to calculate a degree of randomness for each of the plurality of running state distributions, and wherein the unstable driving state detecting section is configured to detect the unstable driving state on a basis of a magnitude relationship in randomness of each of the plurality of running state distributions calculated by the randomness calculating section in addition to the magnitude of the difference quantity between the plurality of running state distributions.

3. The vehicular driving support apparatus as claimed in claim 1, wherein the running state distribution calculating section is configured to calculate the running state distributions corresponding to a predetermined range of time in a recursive manner.

4. The vehicular driving support apparatus as claimed in claim 3, wherein the vehicular driving support apparatus further comprises:
a running scene estimating section configured to estimate a running scene of the vehicle; and
a time range correcting section configured to correct the range of time used in the running state distribution calculating section in accordance with the running scene estimated by the running scene estimating section.

5. The vehicular driving support apparatus as claimed in claim 1, wherein the running state distribution calculating section is configured to partition data of the running state detected by the running state detecting section into a predetermined number of partitions to calculate the plurality of running state distributions, and wherein the distribution difference quantity calculating section is configured to calculate the difference quantity between the plurality of running state distributions with a weight given to each of the partitions.

6. The vehicular driving support apparatus as claimed in claim 5, wherein the vehicular driving support apparatus further comprises:
a running state cumulative frequency distribution calculating section configured to calculate a running state cumulative frequency distribution from the running state distributions calculated by the running state distribution calculating section,
wherein the distribution difference quantity calculating section is configured to use the running state cumulative frequency distribution calculated by the running state cumulative frequency distribution calculating section in the form of a weight for each of the partitions.

7. The vehicular driving support apparatus as claimed in claim 1, wherein the running state distribution calculating section is configured to partition data of the running state into a predetermined number of partitions to calculate the plurality of running state distributions, and wherein the vehicular driving support apparatus further comprises a partition width correcting section configured to correct a width of each of the partitions in accordance with the data of the running state detected by the running state detecting section.

8. The vehicular driving support apparatus as claimed in claim 7, wherein the partition width correcting section is configured to use a vehicle speed which is the data of the running state to correct the width of each of the partitions.

9. The vehicular driving support apparatus as claimed in claim 8, wherein the vehicular driving support apparatus further comprises a partition width correction quantity learning section configured to learn a correction quantity of the width of each of the partitions in the partition width correcting section, and wherein the partition width correcting section corrects the width of each of the partitions in accordance with the correction quantity learned by the partition width correction quantity learning section.

10. The vehicular driving support apparatus as claimed in claim 1, wherein the running state detecting section is configured to obtain a steering angle prediction error in a form of data of the running state.

11. The vehicular driving support apparatus as claimed in claim 10, wherein the vehicular driving support apparatus further comprises a running state data correcting section configured to correct data of the detected running state in accordance with a vehicle speed of the vehicle.

12. The vehicular driving support apparatus as claimed in claim 1, wherein the running state detecting section is configured to detect an accelerator pedal manipulated variable and a brake pedal manipulated variable in a form of data of the running state.

13. The vehicular driving support apparatus as claimed in claim 1, wherein the running state detecting section is configured to detect a yaw rate developed on the vehicle in a form of data of the running state.

14. The vehicular driving support apparatus as claimed in claim 1, wherein the running state detecting section is configured to detect a lateral position within a traffic lane in a form of data of the running state.

15. The vehicular driving support apparatus as claimed in claim 1, wherein the running state detecting section is configured to obtain an inter-vehicle time between the vehicle and a forwardly present obstacle in a form of the detected running state.

16. The vehicular driving support apparatus as claimed in claim 1, wherein the running state detecting section is configured to detect a vehicle speed of the vehicle in a form of data of the running state.

17. The vehicular driving support apparatus as claimed in claim 1, wherein the distribution difference quantity calculating section is configured to calculate a relative entropy in a form of the difference quantity between the plurality of running state distributions.

18. The vehicular driving support apparatus as claimed in claim 17, wherein the distribution difference quantity calculating section is configured to calculate a difference of absolute entropy values in a form of the difference quantity between the plurality of running state distributions in addition to the relative entropy.

19. The vehicular driving support apparatus as claimed in claim 1, wherein data of the running state comprises at least one of a vehicular dynamical motion, a vehicular surrounding environment, and a driving manipulated variable for the vehicle.

20. The vehicular driving support apparatus as claimed in claim 1, wherein the vehicular driving support apparatus further comprises an alarm device configured to issue an alarm to call attention to a vehicle driver when the unstable driving state detecting section detects the unstable driving state.

21. A vehicular driving support method, comprising:
detecting a running state of a vehicle;
calculating a plurality of running state distributions on a basis of the detected running state;
calculating a difference quantity between the calculated plurality of running state distributions; and
detecting an unstable driving state from a magnitude of the calculated difference quantity,
wherein the plurality of running state distributions are calculated such that the plurality of running state distributions are different in range of time.

22. A vehicle equipped with a vehicular driving support apparatus comprising:
a running state detecting section configured to detect a running state of a vehicle;
a running state distribution calculating section configured to calculate a plurality of running state distributions on a basis of the running state detected by the running state detecting section;
a distribution difference quantity calculating section configured to calculate a difference quantity between the plurality of running state distributions calculated by the running state distribution calculating section; and
an unstable driving state detecting section configured to detect an unstable driving state from a magnitude of the difference quantity calculated by the distribution difference quantity calculating section,
wherein the running state distribution calculating section is configured to calculate the plurality of running state distributions such that the plurality of running state distributions are different in range of time.

23. A vehicular driving support apparatus, comprising:
running state detecting means for detecting a running state of a vehicle;
running state distribution calculating means for calculating a plurality of running state distributions on a basis of the running state detected by the running state detecting means;
distribution difference quantity calculating means for calculating a difference quantity between the plurality of running state distributions by the running state distribution calculating means; and
unstable driving state detecting means for detecting an unstable driving state from a magnitude of the difference quantity calculated by the distribution difference quantity calculating means,
wherein the running state distribution calculating means is for calculating the plurality of running state distributions such that the plurality of running state distributions are different in range of time.

* * * * *